(12) United States Patent
Kadotani

(10) Patent No.: US 11,656,542 B2
(45) Date of Patent: May 23, 2023

(54) LIGHT SOURCE APPARATUS AND PROJECTOR

(71) Applicant: SEIKO EPSON CORPORATION, Tokyo (JP)

(72) Inventor: Masato Kadotani, Matsumoto (JP)

(73) Assignee: Seiko Epson Corportation, Tokyo (JP)

( * ) Notice: Subject to any disclaimer, the term of this patent is extended or adjusted under 35 U.S.C. 154(b) by 0 days.

(21) Appl. No.: 17/851,728

(22) Filed: Jun. 28, 2022

(65) Prior Publication Data

US 2022/0413373 A1    Dec. 29, 2022

(30) Foreign Application Priority Data

Jun. 29, 2021    (JP) .............................. JP2021-107568

(51) Int. Cl.
     *G03B 21/20*      (2006.01)
     *G03B 21/16*      (2006.01)
     *G02B 26/00*      (2006.01)

(52) U.S. Cl.
     CPC ......... *G03B 21/204* (2013.01); *G02B 26/008* (2013.01); *G03B 21/16* (2013.01)

(58) Field of Classification Search
     CPC .............................. G02B 26/008; G03B 21/16
     See application file for complete search history.

(56) References Cited

U.S. PATENT DOCUMENTS

2016/0077326 A1    3/2016    Yamagishi et al.
2018/0173086 A1*    6/2018    Noda .................... G03B 21/204

FOREIGN PATENT DOCUMENTS

| JP | 2016-66061 A | 4/2016 |
| JP | 2020-201387 A | 12/2020 |
| JP | 2020201387 A * | 12/2020 ............... F21K 9/64 |

* cited by examiner

*Primary Examiner* — Andrew J Coughlin
*Assistant Examiner* — Nathaniel J Lee
(74) *Attorney, Agent, or Firm* — Dority & Manning, P.A.

(57) ABSTRACT

A light source apparatus includes an enclosure, a phosphor wheel including a phosphor and disposed in the enclosure, a wheel-side heat dissipater that includes a plurality of fins provided at the phosphor wheel and generates an airflow flowing from the side facing the center of the phosphor wheel toward the periphery thereof with the aid of rotation of the phosphor wheel, a driver that rotates the phosphor wheel, a heat receiving member that includes a placement section where the driver is placed and faces the wheel-side heat dissipater, a heat sink coupled to a side of the heat receiving member, the side opposite to the phosphor wheel, and disposed outside the enclosure, and a plurality of columnar protrusions that are provided around the placement section and protrude into the enclosure toward the plurality of fins.

11 Claims, 12 Drawing Sheets

LIGHT SOURCE APPARATUS AND PROJECTOR

The present application is based on, and claims priority from JP Application Serial Number 2021-107568, filed Jun. 29, 2021, the disclosure of which is hereby incorporated by reference herein in its entirety.

BACKGROUND

1. Technical Field

The present disclosure relates to a light source apparatus and a projector.

2. Related Art

There has been a known light source apparatus that includes a phosphor wheel and an enclosure accommodating the phosphor wheel and dissipates heat generated in the phosphor wheel out of the enclosure (see JP-A-2020-201387 and JP-A-2016-066061, for example).

In the light source apparatus described in JP-A-2020-201387, the phosphor wheel includes a circular wheel substrate, a phosphor layer provided at the front surface of the wheel substrate, and a plurality of heat dissipating members provided at the rear surface of the wheel substrate. Out of the plurality of heat dissipating members, the heat dissipating member provided in a position facing the center of rotation of the wheel substrate has the highest heat dissipating performance, and the heat dissipating performance of the heat dissipating members decreases as the Positions where the heat dissipating members are disposed separate away from the center of rotation. The enclosure is provided with a plurality of fins concentric around the center of rotation of the wheel substrate. The plurality of fins are arranged so as to be nested with the fins formed of the heat dissipating members. The heat generated in the phosphor layer is transferred to the plurality of heat dissipating members via the wheel substrate, transferred to the fins with the aid of a fluid between the plurality of heat dissipating members and the fins, and dissipated out of the enclosure.

The light source apparatus described in JP-A-2016-066061 includes a phosphor wheel, a phosphor wheel apparatus accommodating enclosure, and a heat sink structure. The heat generated by a phosphor provided in the phosphor wheel is brought into contact with the heat sink structure with the aid of an airflow generated by the rotation of the phosphor wheel. The airflow flowing along fins of the heat sink structure transmits the heat to the fins, so that the heat generated by the phosphor is discharged out of the phosphor wheel apparatus accommodating enclosure.

The light source apparatus described in JP-A-2020-201387 has, however, the configuration in which the heat dissipating members provided concentrically around the center of rotation of the wheel substrate transfer the heat from the heat dissipating members to the fins with the aid of a Taylor vortex when the wheel substrate rotates. Therefore, if the wheel substrate is not rotated at a sufficiently high rotational speed, the heat may not undesirably be transferred efficiently from the heat dissipating members to the fins.

In the light source apparatus described in JP-A-2016-066061, the heat sink structure is provided at each of a plurality of side surfaces of the enclosure, resulting in a problem of a tendency to an increase in the size of the light source apparatus.

In view of the circumstances described above, there has been a demand for a light, source apparatus configured to improve the cooling efficiency while reducing the increase in the size of the light source apparatus.

SUMMARY

A light source apparatus according to a first aspect of the present disclosure includes an enclosure, a phosphor wheel including a phosphor that converts a wavelength of light incident thereon and disposed in the enclosure, a wheel-side heat dissipater that includes a plurality of fins provided at one surface of the phosphor wheel and generating an airflow flowing from a side facing a center of the phosphor wheel toward a periphery thereof when the phosphor wheel rotates, a driver that rotates the phosphor wheel, a heat receiving member that includes a placement section where the driver is placed and faces the wheel-side heat dissipater, a heat sink coupled in a heat transferable manner to a side of the heat receiving member, the side opposite to the phosphor wheel, and disposed outside the enclosure, and a plurality of columnar protrusions that are provided around the placement section so as to be capable of transferring heat to the heat receiving member and protrude into the enclosure toward the plurality of fins. A dimension of at least one of the plurality of columnar protrusions along a protrusion direction in which the at least one columnar protrusion protrudes, is greater than a dimension of the at least one columnar protrusion perpendicular to the projection direction. Out of the plurality of columnar protrusions, a columnar protrusion disposed upstream of the airflow flowing to the plurality of columnar protrusions divides the airflow toward other columnar protrusions located downstream of the airflow.

A light source apparatus according to a second aspect of the present disclosure includes an enclosure, a phosphor wheel including a phosphor that converts a wavelength of light incident thereon and disposed in the enclosure, a wheel-side heat dissipater that includes a plurality of fins provided at one surface of the phosphor wheel and generating an airflow flowing from a side facing a center of the phosphor wheel toward a periphery thereof when the phosphor wheel rotates, a driver that rotates the phosphor wheel, and a heat dissipating member that faces the wheel-side heat dissipater. The heat dissipating member includes a placement section where the driver is placed, a heat sink provided on a side of the placement section, the side opposite to the phosphor wheel, and disposed outside the enclosure, and a plurality of columnar protrusions provided around the placement section and protruding into the enclosure toward the plurality of fins. A dimension of at least one of the plurality of columnar protrusions along a protrusion direction in which the at least one columnar protrusion protrudes, is greater than a dimension of the at least one columnar protrusion perpendicular to the projection direction. Out of the plurality of columnar protrusions, a columnar protrusion disposed upstream of the airflow flowing to the plurality of columnar protrusions divides the airflow toward columnar protrusions located downstream of the airflow.

A projector according to a third aspect of the present disclosure includes the light source apparatus according to the first or second aspect described above, an image formation apparatus that forms image light by using light outputted from the light source apparatus, and a projection optical apparatus that projects the image light formed by the image formation apparatus.

DESCRIPTION OF EXEMPLARY EMBODIMENTS

First Embodiment

Figure 1:
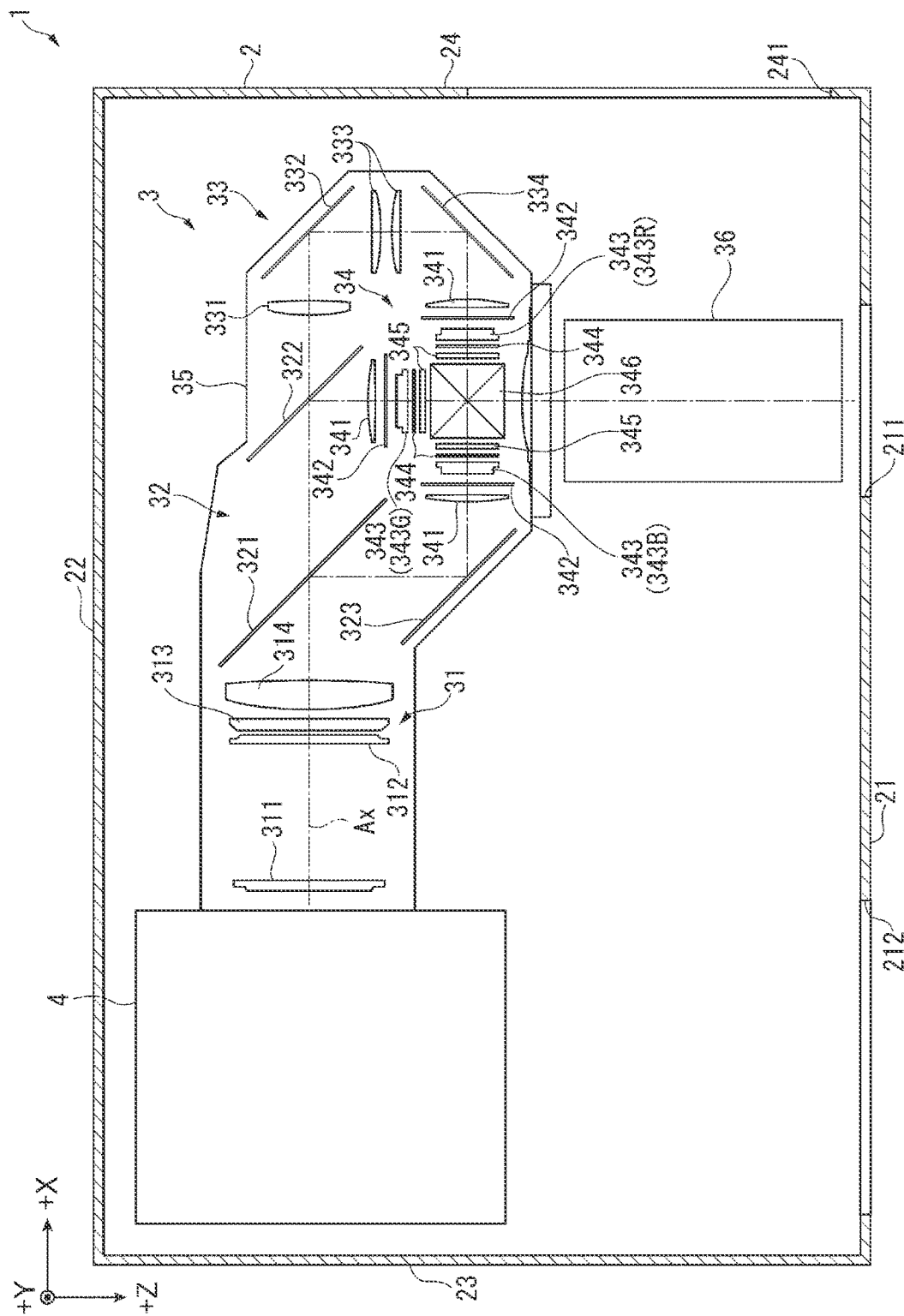
FIG. 1 is a diagrammatic view showing the configuration of a projector according to a first embodiment.

A first embodiment of the present disclosure will be described below with reference to the drawings.
Schematic Configuration of Projector FIG. 1 is a diagrammatic view showing the configuration of a projector 1 according to the present embodiment.

The projector 1 according to the present embodiment modulates light outputted from a light source apparatus 4 to form an image according to image information and enlarges and projects the formed image on a projection receiving surface, such as a screen. The projector 1 includes an exterior enclosure 2 and an image projection apparatus 3, as shown in FIG. 1. In addition to the components described above, the projector 1 includes, although not shown, a power supply that supplies electronic parts that form the projector 1 with electric power, a controller that controls the action of the projector 1, and a cooler that cools a cooling target that forms the projector 1.
Configuration of Exterior Enclosure The exterior enclosure 2 forms the exterior of the projector 1 and accommodates the image projection apparatus 3, the power supply, the controller, and the cooler.

The exterior enclosure 2 has front surface section 21, a rear surface section 22, a left side surface section 23, and a right side surface section 24. Although not shown, the exterior enclosure 2 includes a top surface section to which one-side ends of the surface sections 21 to 24 are coupled and a bottom surface section to which the other-side ends of the surface sections 21 to 24 are coupled. The exterior enclosure 2 is formed, for example, in a substantially box-like shape.

The right side surface section 24 has an introduction port 241. The introduction port 241 introduces the air outside the exterior enclosure 2 into the exterior enclosure 2. The introduction port 241 may be provided with a filter that traps dust contained in the air passing through the introduction port 241.

The front surface section 21 has a passage port 211 located substantially at the center of the front surface section 21. Light projected from a projection optical apparatus 36, which will be described later, passes through the passage port 211.

The front surface section 21 has a discharge port 212 located in the front surface section 21 in a position shifted toward the left side surface section 23.

Air having cooled the cooling target provided in the exterior enclosure 2 is discharged via the discharge port 212 out of the exterior enclosure 2.

In the following description, three directions perpendicular to one another are called directions +X, +Y, and +Z. The direction +X extends from the side facing the left side surface section 23 toward the side facing the right side surface section 24. The direction +X extends along the direction in which the light source apparatus 4, which will be described later, outputs illumination light to a homogenizer 31 in the image projection apparatus 3. The direction +Y extends from the side facing the bottom surface section toward the side facing the top surface section. The direction +Z extends from the side facing the rear surface section 22 toward the side facing the front surface section 21. The direction +Z is the direction in which the projection optical apparatus 36, which will be described later, projects image light in the image projection apparatus 3 when viewed along the direction +Y. Although not shown, the direction opposite the direction +X is a direction −X, the direction opposite the direction +Y is a direction. −Y, and the direction opposite the direction +Z is a direction −Z.
Configuration of Image Projection Apparatus The image projection apparatus 3 forms an image according to image information inputted from the controller and projects the formed image. The image projection apparatus 3 includes the light source apparatus 4, the homogenizer 31, a color separation apparatus 32, a relay apparatus 33, an image formation apparatus 34, an optical part enclosure 35, and the projection optical apparatus 36.

The configuration of the light source apparatus 4 will be described later in detail.

The homogenizer 31 homogenizes the light outputted from the light source apparatus 4. The homogenized light travels via the color separation apparatus 32 and the relay apparatus 33 and illuminates a modulation region of each light modulator 343, which will be described later. The homogenizer 31 includes two lens arrays 311 and 312, a polarization converter 313, and a superimposing lens 314.

The color separation apparatus 32 separates the light incident from the homogenizer 31 into red light, green light, and blue light. The color separation apparatus 32 includes two dichroic mirrors 321 and 322 and a reflection mirror 323, which reflects the separated blue light from the dichroic mirror 321.

The relay apparatus 33 is provided in the optical path of the red light, which is longer than the optical paths of the green light and the blue light, and suppresses loss of the red light. The relay apparatus 33 includes a light-incident-side lens 331, relay lenses 333, reflection mirrors 332 and 334. In the present embodiment, the relay apparatus 33 is provided in the optical path of the red light, but not necessarily. For example, the blue light may be configured to have an optical path longer than those of the red light, and the green light, and the relay apparatus 33 may be provided in the optical path of the blue light.

The image formation apparatus 34 modulates the red light, the green light, and the blue light incident thereon and combines the modulated red light, green light, and blue light with one another to form an image. The image formation apparatus 34 includes three field lenses 341, three light-incident-side polarizers 342, three light modulators 343, three viewing angle compensators 344, and three light-exiting-side polarizers 345, which are provided in accordance with the incident red light, green light, and blue light, and one light combiner 346.

The light modulators 343 modulate the light outputted from the light source apparatus 4 in accordance with the image information. The three light modulators 343 include a light modulator 343R, which modulates the red light, a light modulator 343G, which modulates the green light, and a light modulator 343B, which modulates the blue light. The light modulators 343 are each formed of a transmissive liquid crystal panel, and the light-incident-side polarizers 342, the light modulators 343, and the light-exiting-side polarizers 345 form liquid crystal light valves.

The light combiner 346 combines the blue light modulated by the light modulator 343B, the green light modulated by the light modulator 343G, and the red light modulated by the light modulator 343R with one another to form an image and outputs the formed image to the projection optical apparatus 36. In the present embodiment, the light combiner 346 is formed of a cross dichroic prism, but not necessarily, and can instead be formed, for example, of a plurality of dichroic mirrors.

The optical part enclosure 35 accommodates the apparatuses 31 to 34 described above. An illumination optical axis Ax, which is the optical axis in the design stage, is set in the image projection apparatus 3, and the optical part enclosure 35 holds the apparatuses 31 to 34 in predetermined positions on the illumination optical axis Ax. The light source apparatus 4 and the projection optical apparatus 36 are disposed in predetermined positions on the illumination optical axis Ax.

The projection optical apparatus 36 is a projection lens that enlarges and projects the image incident from the image formation apparatus 34 onto the projection receiving surface. That is, the projection optical apparatus 36 projects the light modulated by the light modulators 343. The projection optical apparatus 36 can, for example, be an assembled lens including a plurality of lenses and a tubular lens barrel that accommodates the plurality of lenses.

Configuration of Light Source Apparatus

Figure 2:
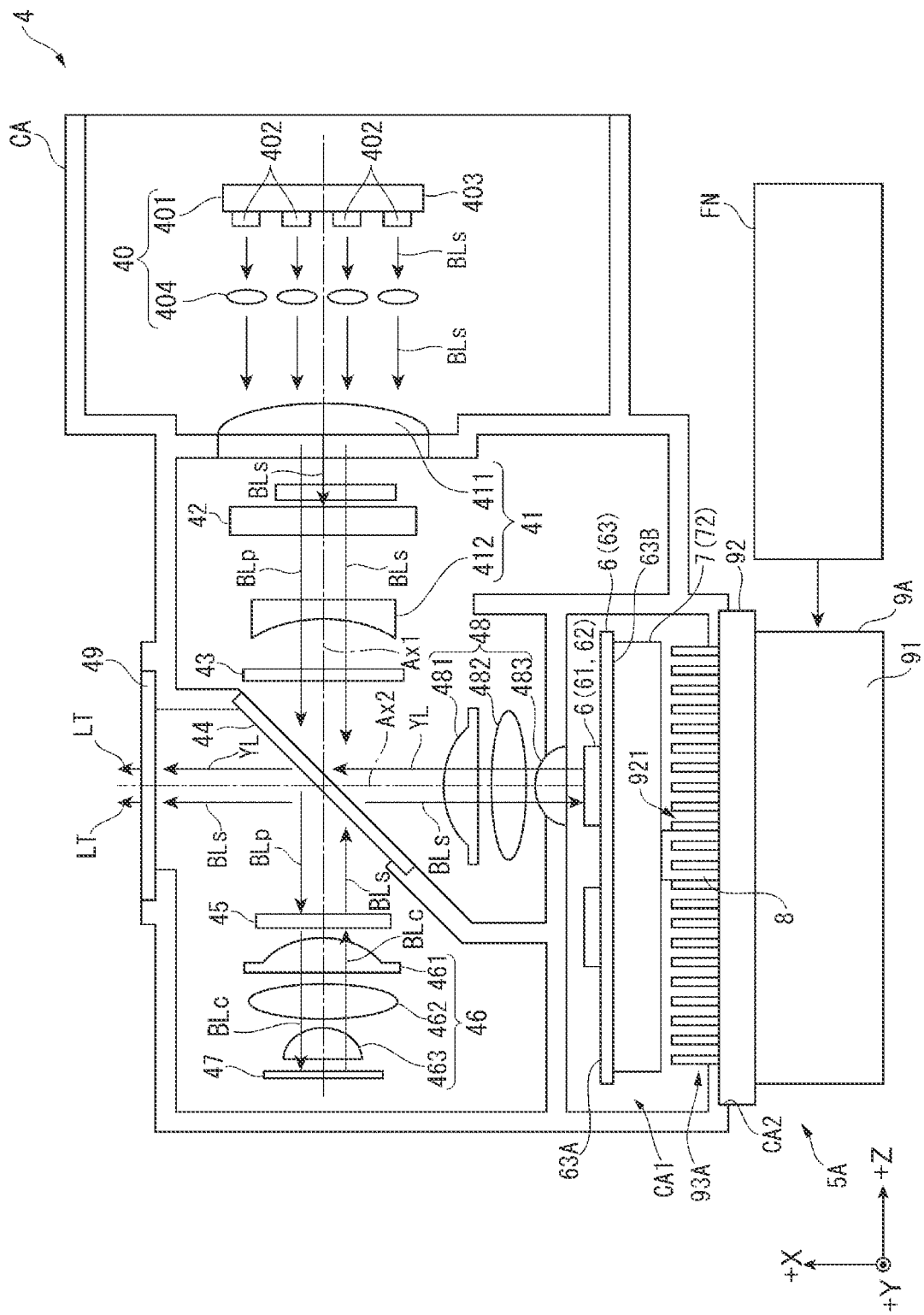
FIG. 2 is a diagrammatic view showing a light source apparatus according to the first embodiment.

FIG. 2 is a diagrammatic view showing the light source apparatus 4.

The light source apparatus 4 outputs the illumination light, with which the light modulators 343 are illuminated, to the homogenizer 31. The light source apparatus 4 includes a light source enclosure CA, a light source section 40, an afocal optical element 41, a first phase retarder 42, a diffusive transmitter 43, a light separator/combiner 44, a second phase retarder 45, a first light collector 46, a diffusive optical element 47, a second light collector 48, a third phase retarder 49, and a wavelength conversion apparatus 5A, as shown in FIG. 2.

The following optical axes are set in the light source apparatus 4: an illumination optical axis Ax1, which linearly extends along the direction −Z; and an illumination optical axis Ax2, which is perpendicular to the illumination optical axis Ax1 and linearly extends along the direction +X.

The light source section 40, the afocal optical element 41, the first phase retarder 42, the diffusive transmitter 43, the light separator/combiner 44, the second phase retarder 45, the first light collector 46, and the diffusive optical element 47 are disposed on the illumination optical axis Ax1.

The wavelength conversion apparatus 5A, the second light collector 48, the light separator/combiner 44, and the third phase retarder 49 are disposed on the illumination optical axis Ax2.

Configuration of Light Source Enclosure

The light source enclosure CA corresponds to an enclosure. The light source enclosure CA is a sealed enclosure which dust and other foreign matter are unlikely to enter and which accommodates the light source section 40, the afocal optical element 41, the first phase retarder 42, the diffusive transmitter 43, the light separator/combiner 44, the second phase retarder 45, the first light collector 46, the diffusive optical element 47, the second light collector 48, the third phase retarder 49, and the wavelength conversion apparatus 5A.

The light source enclosure CA has an accommodation space CA1 and an opening CA2. The accommodation space CA1 accommodates a portion of the wavelength conversion apparatus 5A. Specifically, the accommodation space CA1 accommodates a phosphor wheel 6, a heat dissipater 7, a driver 8, and a heat receiving member of a heat dissipating member 9A. The aperture CA2 is an opening that allows the portion of the wavelength conversion apparatus 5A to be accommodated in the accommodation space CA1, and is closed by the heat receiving member 92 of the heat dissipating member 9A. When the opening CA2 is closed by the heat dissipating member 9A, the accommodation space CA1 is sealed.

Configuration of Light Source Section

The light source section 40 includes a light source 401, which outputs blue light in the direction −Z and a plurality of collimator lenses 404.

The light source 401 includes a plurality of solid-state light sources 402 and a support member 403.

The plurality of solid-state light sources 402 are each formed of a semiconductor laser that outputs the blue light. In detail, the solid-state light sources 402 each output s-polarized blue light BLs in the direction +Z to the light separator/combiner 44. The solid-state light sources 402 may instead each output p-polarized blue light BLp to the light separator/combiner 44. The blue light outputted by each of the solid-state light sources is, for example, laser light having a peak wavelength of 440 nm. The blue light outputted from the plurality of solid-state light sources 402 enters the collimator lenses 404.

The support member 403 supports the plurality of solid-state light sources 402 arranged in an array in a plane perpendicular to the illumination optical axis Ax1. The support member 403 is a metallic member having thermal conductivity.

The plurality of collimator lenses 404 convert the blue light incident from the plurality of solid-state light sources 402 into a collimated luminous flux. The blue light having exited out of the plurality of collimator lenses 404 enters the afocal optical element 41.

It is assumed in the present embodiment that the light source 401 outputs the s-polarized blue light BLs, but not necessarily. The light source 401 may instead output the p-polarized blue light BLp or blue light that is a mixture of s-polarized light and p-polarized light. In the latter case, the first phase retarder 42 can be omitted.

Configuration of Afocal Optical Element

The afocal optical element 41 adjusts the luminous flux diameter of the blue light BLs incident from the light source section 40 in the direction −Z. The afocal optical element 41 is formed of a lens 411, which collects light incident thereon, and a lens 412, which parallelizes the luminous flux collected by the lens 411.

The afocal optical element 41 may be omitted.

Configuration of First Phase Retarder

The first phase retarder 42 is provided between the lens 411 and the lens 412. The first phase retarder 42 converts part of the blue light BLs incident thereon into light containing the s-polarized blue light BLs and the p-polarized blue light BLp and outputs the converted light. A pivot apparatus may be provided to cause the first phase retarder 42 to pivot around a pivotal axis extending along the illumination optical axis Ax1. In this case, the ratio between the s-polarized component and the p-polarized component in the blue light that exits out of the first phase retarder 42 can be adjusted in accordance with the angle of the pivotal movement of the first phase retarder 42.

Configuration of Diffusive Transmitter

The diffusive transmitter 43 homogenizes the illuminance distribution of the blue light BLp and BLs incident from the lens 412 in the direction −Z. The diffusive transmitter 43 can, for example, have a configuration including a hologram, a configuration in which a plurality of lenslets are arranged in a plane perpendicular to the optical axis, or a configuration in which a light passage surface is a rough surface.

The diffusive transmitter 43 may be replaced with a homogenizer optical element including a pair of multi-lenses.

Configuration of Light Separator/Combiner

The blue light BLs and BLp having passed through the diffusive transmitter 43 enters the light separator/combiner 44.

The light separator/combiner 44 has the function as a light separator that separates light incident thereon and the function as a light combiner that combines light incident from a direction and light incident from another direction. In other words, the light separator/combiner 44 functions as a light separator as well as a light combiner.

The light separator/combiner 44 is a polarization beam splitter that separates the s-polarization component and the p-polarization component contained in the incident light from each other. Specifically, the light separator/combiner 44 reflects the s-polarized component and transmits the p-polarized component. The light separator/combiner 44 has color separation characteristics that cause the light separator/combiner 44 to transmit light having a predetermined wavelength and longer wavelengths irrespective of the polarization state of the light incident on the light separator/combiner 44, the s-polarized component or the p-polarized component. Out of the blue light BLp and BLs that enters the light separator/combiner 44 from the diffusive transmitter 43, the p-polarized blue light BLp passes in the direction −Z through the light separator/combiner 44 and enters the second phase retarder 45. On the other hand, the s-polarized blue light BLs is reflected in the direction −X off the light separator/combiner 44 and enters the second light collector 48.

The light separator/combiner 44 may instead have the function of a half-silvered mirror that transmits part of the light incident from the light source section 40 via the diffusive transmitter 43 and reflects the remaining light and the function of a dichroic mirror that reflects the blue light incident from the diffusive optical element and transmits light incident from the wavelength conversion apparatus 5A and having wavelengths longer than the wavelength of the blue light. In this case, the first phase retarder 42 can be omitted.

Configuration of Second Phase Retarder

The second phase retarder 45 is disposed in a position shifted in the direction. −Z from the light separator/combiner 44. That is, the second phase retarder 45 is disposed between the light separator/combiner 44 and the first light collector 46. The second phase retarder 45 converts the blue light BLp having passed through the light separator/combiner 44 into circularly polarized blue light BLc. The blue light BLc having passed in the direction −Z through the second phase retarder 45 enters the first light collector 46.

Configuration of First Light Collector

The first light collector 46 causes the blue light BLc, into which the second phase retarder 45 converted the blue light BLp having passed in the direction −Z through the light separator/combiner 44, to be collected at the diffusive optical element 47. Furthermore, the first light collector 46 parallelizes the light incident in the direction +Z from the diffusive optical element 47 and causes the parallelized light to exit to the second phase retarder 45.

In the present embodiment, the first light collector 46 is formed of three lenses 461, 462, and 463, but the number of lenses that form the first light collector 46 is not limited to a specific number.

Configuration of Diffusive Optical Element

The diffusive optical element 47 diffuses the blue light BLc incident thereon in such a way that the diffused blue light diffuses at an angle of diffusion equal to that of the fluorescence YL outputted from the wavelength conversion apparatus 5A. Specifically, the diffusive optical element 47 reflects and diffuses in the direction +Z the blue light BLc incident in the direction −Z from first light collector 46. The diffusive optical element 47 is a reflector that reflects the blue light BLc incident thereon in the Lambertian reflection scheme. The diffusive optical element 47 may be rotated by a rotating apparatus around an axis of rotation parallel to the illumination optical axis Ax1.

The blue light BLc diffused by the diffusive optical element 47 passes through the first light collector 46 and then enters the second phase retarder 45. When reflected off the diffusive optical element 47, the blue light BLc having entered the diffusive optical element 47 is converted into circularly polarized light having a polarization rotational direction opposite to the polarization rotational direction of the blue light before reflected. The blue light BLc having entered the second phase retarder 45 via the first light collector 46 is therefore converted into the s-polarized blue light BLs by the second phase retarder 45. The blue light BLs is then reflected in the direction +X off the light separator/combiner 44 and enters the third phase retarder 49.

Configuration of Second Light Collector

The second light collector 48 causes the blue light BLs reflected in the direction −X off the light separator/combiner 44 to be collected at the wavelength conversion apparatus 5A. Furthermore, the second light collector 48 parallelizes the fluorescence YL incident in the direction +X from the wavelength conversion apparatus 5A and causes the parallelized fluorescence YL to exit to the light separator/combiner 44.

In the present embodiment, the second light collector 48 is formed of three lenses 481, 482, and 483, but the number of lenses that form the second light collector 48 is not limited to a specific number.

Schematic Configuration of Wavelength Conversion Apparatus

The wavelength conversion apparatus 5A converts the wavelength of the blue light BLs incident from the second light collector 48.

That is, the wavelength conversion apparatus 5A outputs the fluorescence YL having wavelengths longer than that of the incident blue light BLs. In detail, the wavelength conversion apparatus 5A is a reflective wavelength converter that emits the fluorescence YL toward the side on which the blue light BLs is incident. The blue light BLs incident on the wavelength conversion apparatus 5A corresponds to excitation light or light that belongs to a first wavelength band, and the fluorescence YL corresponds to converted light or light that belongs to a second wavelength band. The configuration of the wavelength conversion apparatus 5A will be described later in detail.

The fluorescence YL outputted in the direction +X from the wavelength conversion apparatus 5A is parallelized by the second light collector 48 and then enters the light separator/combiner 44. As described above, since the light separator/combiner 44 is characterized so as to transmit the fluorescence YL, the fluorescence YL that enters the light separator/combiner 44 along the direction +X passes through the light separator/combiner 44 and enters the third phase retarder 49. That is, the light that exits out of the light separator/combiner 44 and enters the third phase retarder 49 is white light that is the mixture of the blue light his and the fluorescence YL.

Configuration of Third Phase Retarder

The third phase retarder 49 converts the white light containing the blue light his and the fluorescence YL incident from the light separator/combiner 44 into white light that is a mixture of s-polarized light and p-polarized light. The thus converted white light exits as illumination light LT in the direction +X and enters the homogenizer 31 described above.

Detailed on of Wavelength Conversion Apparatus

The wavelength conversion apparatus 5A includes the phosphor wheel 6, the heat dissipater 7, the driver 8, and the heat dissipating member 9A, as shown in FIG. 2. Out of the components described above, the phosphor wheel 6, the heat dissipater 7, the driver 8, and part of the heat dissipating member 9A are disposed in the accommodation space CA1.

In the following description, the blue light Ins incident on the wavelength conversion apparatus 5A from the second light collector 46 is referred to as the excitation light.

Configuration of Phosphor Wheel

Figure 3:
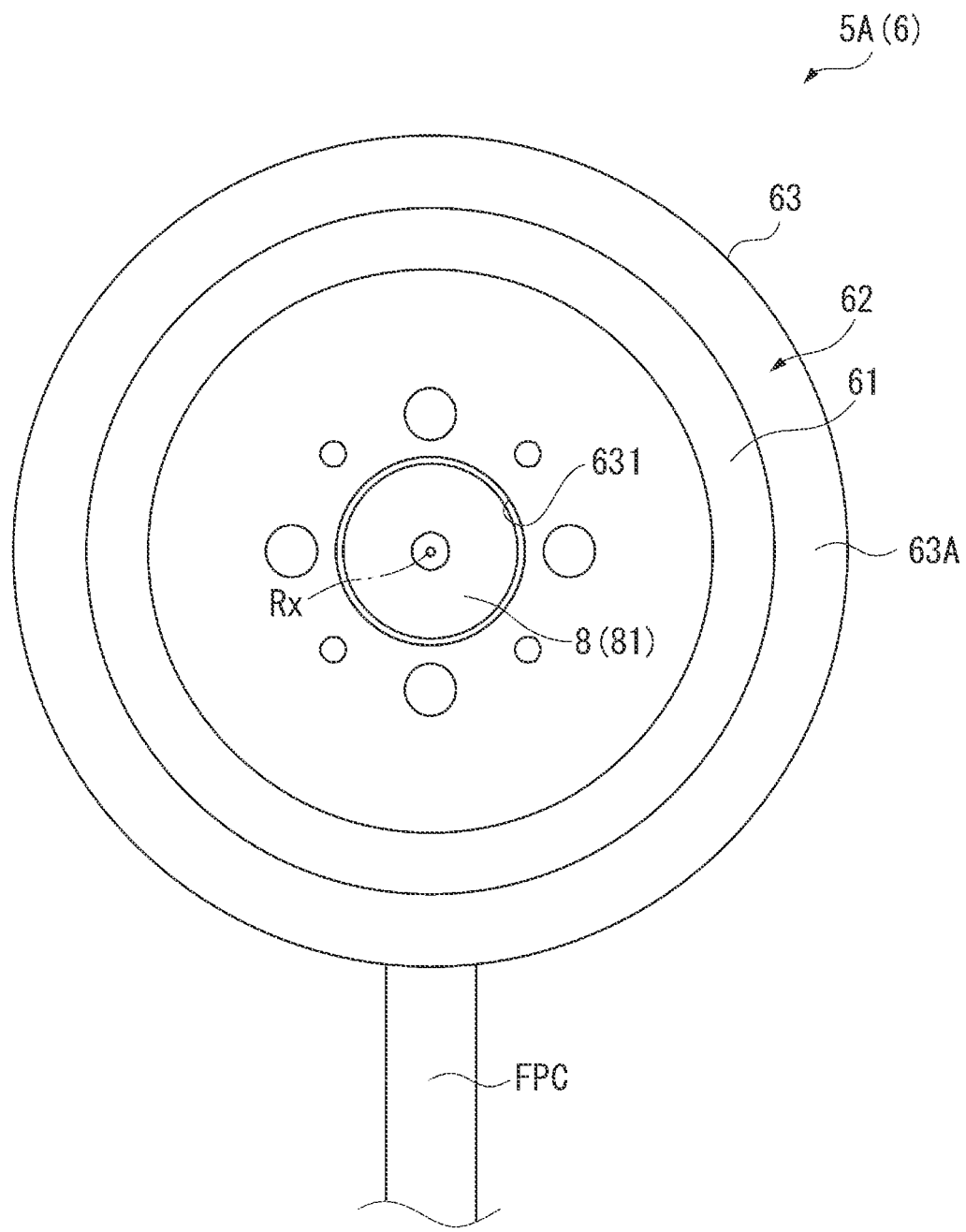
FIG. 3 is a plan view of a phosphor wheel according to the first embodiment viewed from an excitation light incident side.

FIG. 3 is a plan view of the phosphor wheel 6 viewed from the excitation light incident side.

The phosphor wheel 6 is disposed in a position shifted toward the second light collector 48 from the driver 8, and is rotated by the driver 8 around an axis of rotation Rx, which is substantially parallel to the illumination optical axis Ax2. The phosphor wheel 6 is a wavelength converter including a phosphor layer 61, a reflection layer 62, and a support substrate 63, as shown in FIG. 3.

The phosphor layer 61 converts the wavelength of the excitation light incident thereon. The phosphor layer 61 contains phosphor particles that are excited with the excitation light incident thereon and emit the fluorescence YL having wavelengths longer than the wavelength of the incident excitation light. That is, the phosphor layer 61 corresponds to a phosphor. The fluorescence YL is light, for example, having a peak wavelength ranging from 500 to 700 nm. That is, the fluorescence YL contains green light and red light. The phosphor layer 61 is formed in a ring shape around the axis of rotation Rx of the support substrate 63 when viewed from the excitation light incident side.

The reflection layer 62 is provided between the phosphor layer 61 and the support substrate 63. The reflection layer 62 reflects the light incident from the phosphor layer 61. The reflection layer 62 may form a first surface 63A of the support substrate 63.

The support substrate 63 is a disk-shaped substrate that supports the phosphor layer 61 and the reflection layer 62. The support substrate 63 has the first surface 63A, which is the excitation-light-incident-side surface, and a fitting hole 631 provided at the center of the support substrate 63.

The phosphor layer 61 and the reflection layer 62 are disposed at the first surface 63A. That is, the first surface 63A is a surface that supports the phosphor layer 61 and the reflection layer 62.

Part of the driver 8 is fitted into the fitting hole 631 from the side opposite to the excitation light incident side. The support substrate 63 is rotated by the driver 8 around the axis of rotation Rx.

Figure 4:
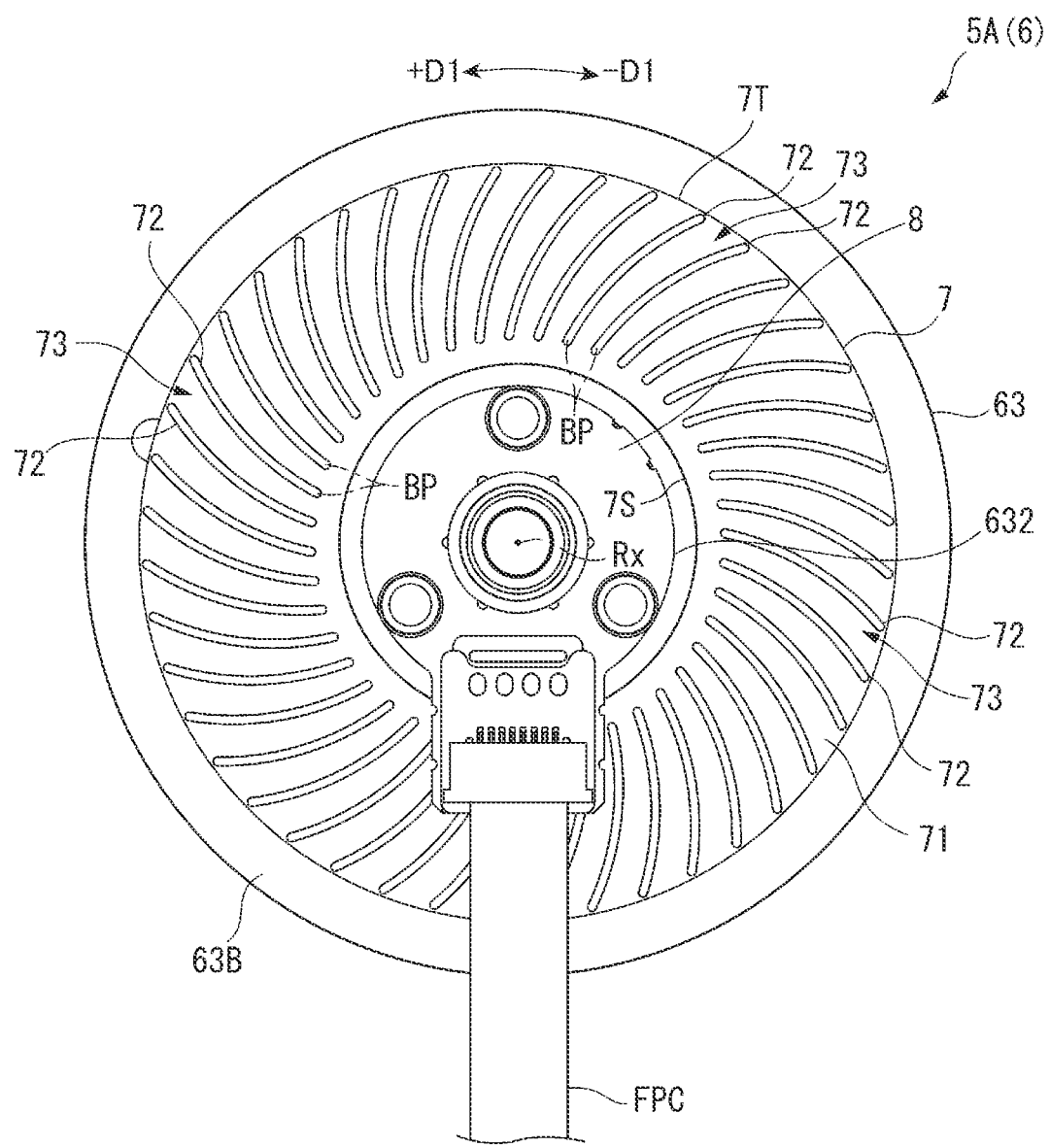
FIG. 4 is a plan view of the phosphor wheel and a heat dissipater according to the first embodiment viewed from the side opposite to the excitation light incident side.

FIG. 4 is a plan view of the phosphor wheel 6 and the heat dissipater 7 viewed from the side opposite to the excitation light incident side. In FIG. 4, only part of a plurality of fins 72 and part of a plurality of grooves 73, which form the heat dissipater 7, are labeled with reference characters for clarity of illustration.

The support substrate 63 has a second surface 63B, which is the surface opposite to the first surface 63A, and includes a coupler 632, as shown in FIG. 4.

The coupler 632 is a central portion of the second surface 63B. Part of the driver 8 is coupled to the coupler 632.

Configuration of Heat Dissipater

The heat dissipater 7 corresponds to a wheel-side heat dissipater. The heat dissipater 7 is provided at the second surface 63B and has the form of a ring located outside the coupler 632. The heat dissipater 7 is coupled in a heat transferrable manner to the second surface 63B of the support substrate 63 and dissipates heat transferred from the phosphor layer 61 via the support substrate 63. In detail, the heat dissipater 7 transfers the heat transferred from the phosphor layer 61 to a gas caused to flow when the phosphor wheel 6 is rotated. The phosphor layer 61 is thus cooled.

The heat dissipater 7 includes a heat transfer substrate 71, the plurality of fins 72, and the plurality of grooves 73 provided between the plurality of fins 72.

The heat transfer substrate 71 is a ring-shaped substrate and is made of a metal having high thermal conductivity, such as aluminum. The heat transfer substrate 71 is attached to a portion of the second surface 63B, the portion outside the coupler 632, and transfers the heat transferred from the second surface 63B to the plurality of fins 72.

The plurality of fins 72 rise from the heat transfer substrate 71 toward a side of the wavelength conversion apparatus 5A, the side opposite to the excitation light incident side. The plurality of fins 72 are arranged at substantially equal intervals along a direction +D1, which is the direction in which the phosphor wheel 6 rotates. That is, the fins 72 extend in an arcuate shape from respective base points BP, which are located on the side facing an inner-side edge 7S of the heat transfer substrate 71 and set at substantially equal intervals along the direction +D1, toward an outer-side edge 7T of the heat transfer substrate 71. In detail, the plurality of fins 72 extend in an arcuate shape in a direction −D1, which is opposite the direction +D1, from the base points BP toward the outer-side edge 7T.

When the phosphor wheel 6 including the thus configured heat dissipater 7 is rotated by the driver 8, an airflow flowing along the grooves 73 is generated from the center of the second surface 63B toward the periphery thereof. When the airflow flows along the grooves 73, the airflow comes into contact with the fins 72, which sandwich the grooves 73 in the direction +D1, so that the heat is transferred from the fins 72 to the airflow. The fins 72 are thus cooled, and the phosphor layer 61 is in turn cooled.

As will be described later in detail, the airflow generated by the rotation of the phosphor wheel 6 flows to the heat dissipating member 9A provided in a position where the heat dissipating member 9A faces the plurality of fins 72. The heat of the airflow is thus transferred to the heat dissipating member 9A, and the heat transferred to the heat dissipating member 9A is dissipated out of the light source enclosure CA.

Configuration of Driver

The driver 8 rotates the support substrate 63 around the axis of rotation Rx in the direction +D1 to rotate the phosphor wheel 6 in the direction +D1. The driver 8 includes a rotor 81, which rotates around the axis of rotation Rx, and a body 82, which rotates the rotor 81.

The rotor 81 is disposed in a position shifted from the body 82 toward the excitation light incident side of the wavelength conversion apparatus 5A. The rotor 81 is fixed to the support substrate 63 with part of the rotor 81 fitted into the fitting hole 631, as shown in FIG. 3.

The body 82 includes a motor that rotates the rotor 81. The body 82 is disposed in the heat dissipating member 9A.

The rotation of the phosphor wheel 6 achieved by the driver 8 prevents the excitation light from being continuously incident on a single point in the phosphor layer 61. Therefore, a decrease in wavelength conversion efficiency of the phosphor layer 61 is suppressed, and the airflow generated by the rotation of the phosphor wheel 6 cools the phosphor wheel 6.

Configuration of Heat Dissipating Member

Figure 5:
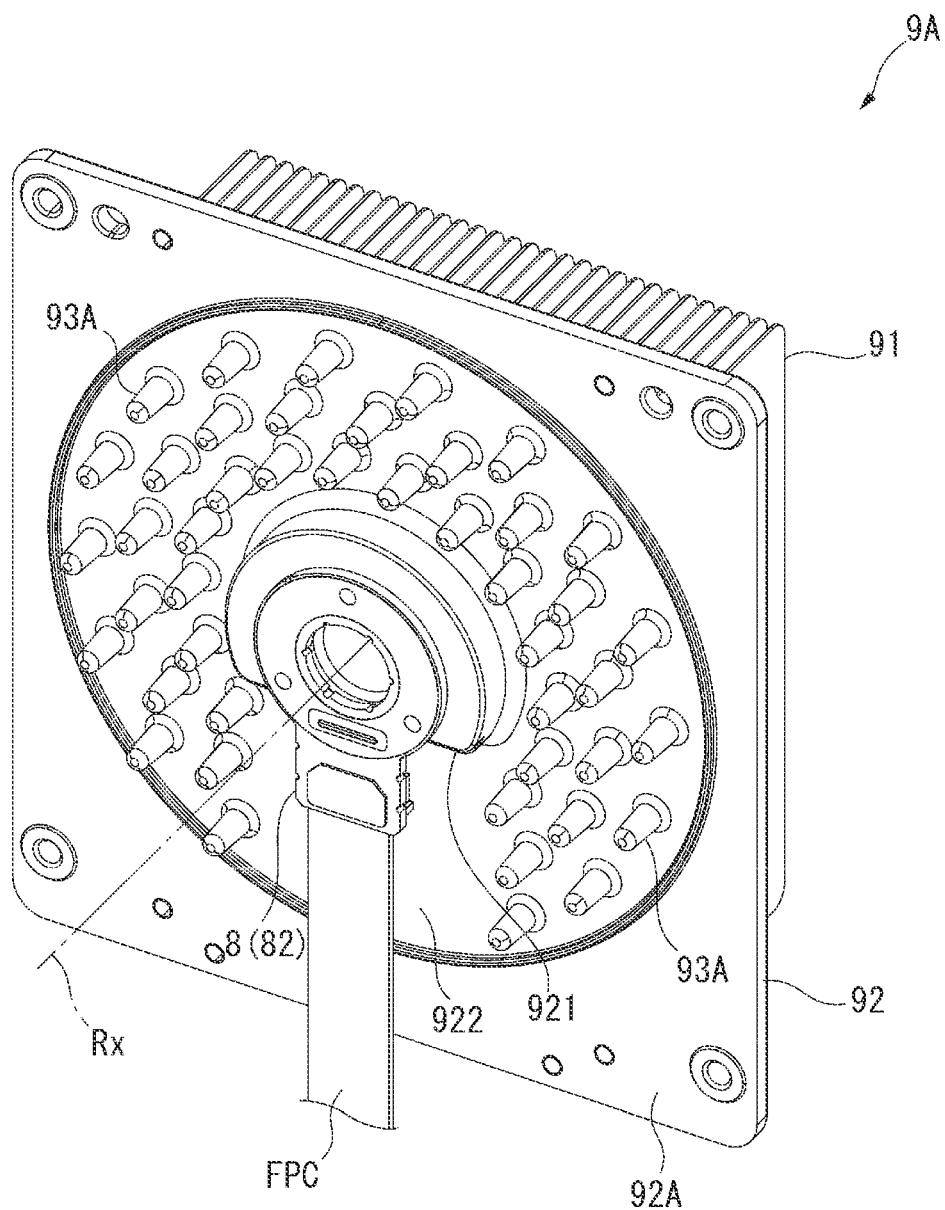
FIG. 5 as a perspective view showing a heat dissipating member according to the first embodiment.

FIG. 5 is a perspective view showing the heat dissipating member 9A.

The heat dissipating member 9A receives the heat generated in the phosphor layer 61 via the airflow generated by the rotation of the phosphor wheel 6, and then dissipates the received heat out of the light source enclosure CA. The heat dissipating member 9A is disposed in a position where the heat dissipating member 9A faces the heat dissipater 7 in the light source enclosure CA. That is, the heat disspating member 9A is disposed on the side opposite to the excitation light incident side of the phosphor wheel 6 and the heat dissipater 7, and is fixed in a position where the heat dissipating member 9A closes the aperture CA2 described above.

The heat dissipating member 9A includes a heat sink 91, the heat receiving member 92, and a plurality of columnar protrusions 93A, as shown in FIG. 5. The heat receiving member 92 and the plurality of columnar protrusions 93A may be integrated with each other through integral molding, or the heat sink 91, the heat receiving member 92, and the plurality of columnar protrusions 93A may all be integrated with one another through integral molding. Instead, the heat sink 91, the heat receiving member 92, and the plurality of columnar protrusions 93A may be coupled to each other to form a single unit.

Configuration of Heat Sink

The heat sink 91 corresponds to a heat-dissipating member-side heat dissipater and dissipates the heat transferred via the heat receiving member 92. The heat sink 91 is disposed outside the light source enclosure CA when the wavelength conversion apparatus 5A is attached to the light source enclosure CA. The heat transferred to the heat sink 91 via the heat receiving member 92 is therefore dissipated out of the light source enclosure CA.

Although not shown, a fan FN, which forms the cooler described above, is provided outside the light source enclosure CA, and the fan FN causes a cooling gas in the exterior enclosure 2 to flow to the heat sink 91. The cooling gas to which the heat has been transferred from the heat sink 91 is discharged out of the exterior enclosure 2 via the discharge port 212 described above.

Configuration of Heat Receiving Member

Figure 6:
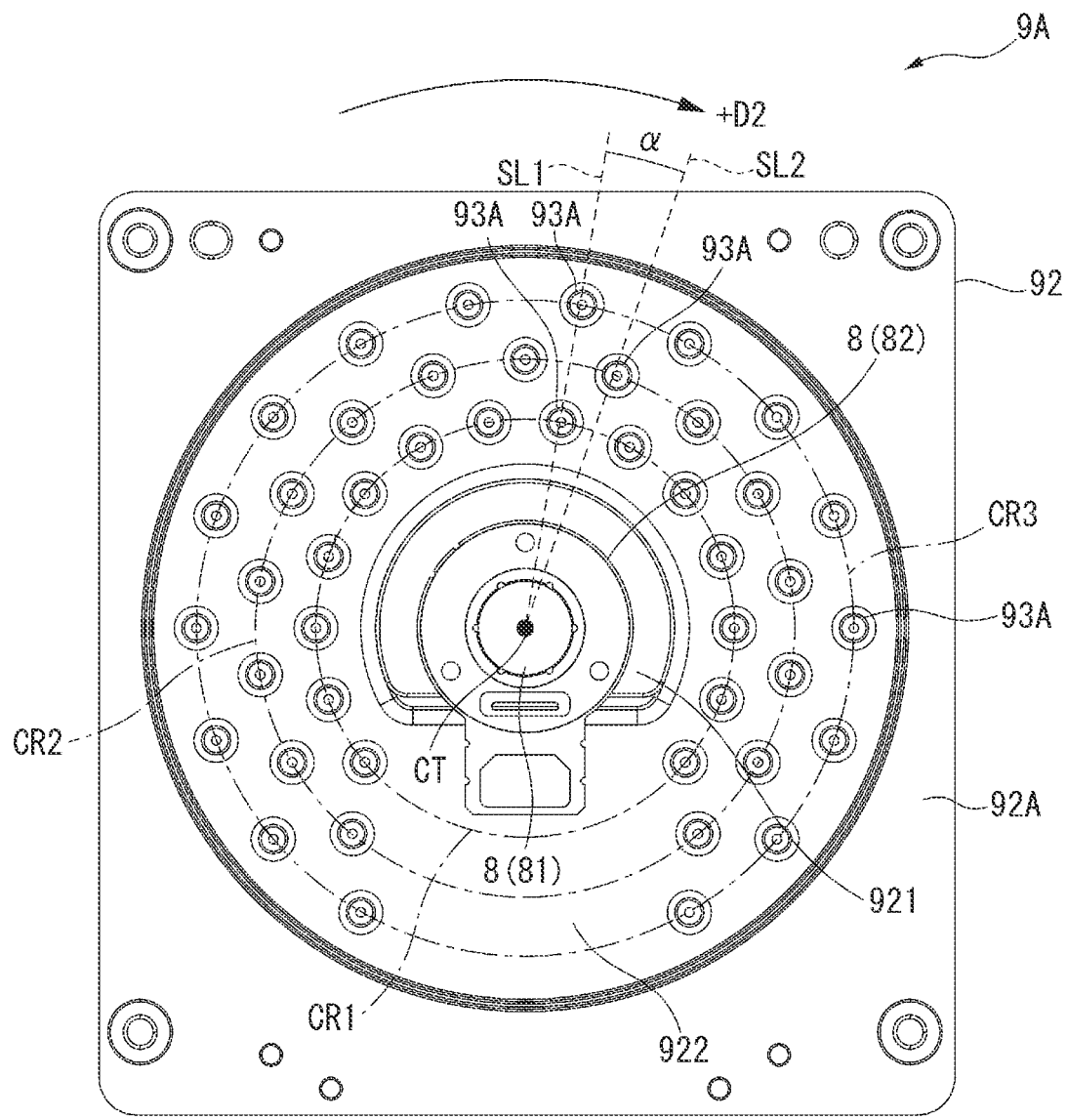
FIG. 6 is a plan view of the heat dissipating member according to the first embodiment.

FIG. 6 is a plan view of the heat dissipating member 9A viewed from the excitation light incident side of the wavelength conversion apparatus 5A.

The heat receiving member 92 is a substantially rectangular plate-shaped element and corresponds to a heat receiving member. The heat receiving member 92 closes the opening CA2 to substantially seals the accommodation space CA1, as shown in FIG. 2. The heat receiving member 92 receives the heat from the airflow generated by the rotation of the phosphor wheel 6 and transfers the received heat to the heat sink 91. The heat receiving member 92 includes a placement section 921 and a wiring placement section 922 disposed at a surface 92A of the heat receiving member 92, the surface facing the heat dissipating section 7, as shown in FIGS. 5 and 6.

The placement section 921 is provided substantially at the center of the surface 92A of the heat receiving member 92, the surface facing the phosphor wheel 6, as shown in FIGS. 5 and 6. The body 82 of the driver 8 is placed at the placement section 921. In detail, the placement section 921 is a substantially circular recess recessed toward the side opposite to the phosphor wheel 6, and the body 82 is disposed with the body 82 fit into the Placement section 921.

The wiring placement section 922 is a flat portion extending from the placement section 921 along one direction and extending off the heat receiving member 92. Wiring FPC, which is coupled to the driver 8 placed in the placement section 921, is placed at the wiring placement section 922.

In the present embodiment, the wiring FPC is formed of a flexible printed circuit board and may instead be any other wiring constituent member, such as cables.

Configuration of Columnar Protrusions

The airflow generated by the rotation of the phosphor wheel 6 flows to the plurality of columnar protrusions 93A, and the plurality of columnar protrusions 93A transfer the heat received from the flowing airflow to the heat receiving member 92.

The plurality of columnar protrusions 93A are provided around the placement section 921 so as to be capable of transferring heat to the heat receiving member 92. In detail, the plurality of columnar protrusions 93A are provided at the surface 92A in positions around the placement section 921 that do not fall within the wiring placement section 922. That is, the plurality of columnar protrusions 93A are provided at the surface 92A of the heat receiving member 92 except the wiring placement section 922. The plurality of columnar protrusions 93A protrude from, the surface 92A into the light source enclosure CA toward the plurality of fins 72 of the heat dissipater 7. In the present embodiment, the plurality of columnar protrusions 93A each rise from the surface 92A and have a substantially truncated conical shape.

In detail, the plurality of columnar protrusions 93A are provided concentrically around the placement section 921. In the present embodiment, a plurality of reference circles CR1, CR2, and CR3, which are concentric circles around the placement section 921 and apart from each other at substantially equal intervals, are set at the surface 92A, and the plurality of columnar protrusions 93A are disposed on the plurality of reference circles CR1, CR2, and CR3. The reference circles CR1 to CR3 are imaginary concentric circles, with the innermost reference circle being a reference circle CR1 and the outermost reference circle being a reference circle CR3.

The plurality of columnar protrusions 93A are provided on the reference circles CR1 to CR3 and equally spaced from each other in a direction +D2, which is the circumferential direction around the placement section 921. Specifically, the plurality of columnar protrusions 93A are provided at 20° angular intervals in the direction +D2 on the reference circles CR1 to CR3.

The cycle of the arrangement of the columnar Protrusions 93A on the odd-numbered reference circles CR1 and CR3 and the cycle of the arrangement of the columnar protrusion 93A on the even-numbered reference circle CR2 are out of phase with respect to each other.

In the present embodiment, let SL1 be an imaginary reference straight line that connects the placement section 921 (center CT of placement section 921, for example) to one of the plurality of columnar protrusions 93A that is disposed on the reference circle CR1, and the columnar Protrusions 93A on the odd-numbered reference circles CR1 and CR3 are provided at 20° angular intervals from the reference line SL1 in the direction +D2. Similarly, let SL2 be an imaginary reference straight line that connects the placement section 921 (center CT of placement section 921, for example) to one of the plurality of columnar protrusions 93A that is located on the reference circle CR2, and the columnar protrusions 93A on the even-numbered reference circle CR2 are provided at 20° angular intervals from the reference line SL2 in the direction +D2. An intersection angle α between the reference line SL1 and the reference line SL2 closest to the reference line SL1 in the direction +D2 10°.

As described above, in the present embodiment, the plurality of columnar protrusions 93A are so disposed that the cycle of the arrangement of the columnar protrusions 93A on the odd-numbered reference circles is out of phase with respect to that on the even-numbered reference circle. The out-of-phase arrangement allows the airflow flowing along the surface 92A to readily collide with the columnar protrusions 93A, whereby the heat of the airflow can be readily transferred to the columnar protrusions 93A.

The plurality of columnar protrusions 93A have the same outer diameter on the reference circles CR1 to CR3, where the columnar protrusions 93A are provided. Although not shown, in the present embodiment, the height dimension of the columnar protrusions 93A in the direction in which the columnar protrusions 93A rise from the surface 92A is at least twice the outer diameter of the columnar protrusions 93A.

It can be said that the thus configured plurality of columnar protrusions 93A include a plurality of first columnar protrusions disposed on the side facing the placement section 921 when viewed from the phosphor wheel 6 and a plurality of second columnar protrusions disposed outside the plurality of first columnar protrusions when viewed from the phosphor wheel 6. The plurality of first columnar protrusions can by way of example be the plurality of columnar protrusions 93A disposed on the reference circle CR1 set in a position facing the placement section 921, and the plurality of second columnar protrusions can by way of example be the plurality of columnar protrusions 93A disposed on the reference circles CR2 and CR3 set in positions shifted outward from the reference circle CR1 with respect to the placement section 921.

Airflow Generated when Phosphor Wheel is Rotated in Accommodation Space

Figure 7:
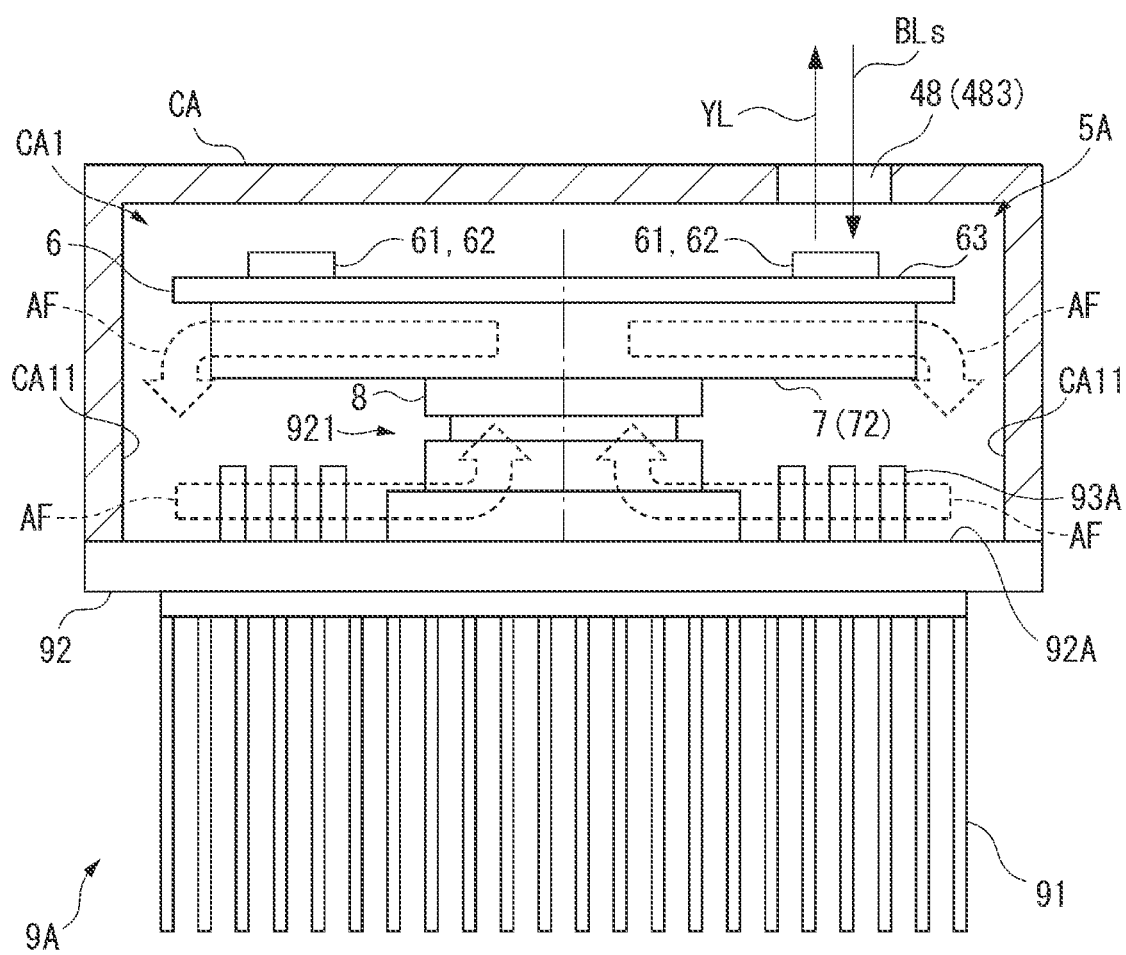
FIG. 7 is a diagrammatic view showing an airflow in an accommodation space of a light source enclosure according to the first embodiment.

FIG. 7 is a diagrammatic view showing an airflow AF in the accommodation space CA1 of the light source enclosure CA.

The airflow AF generated when the phosphor wheel 6 is rotated by the driver 8 will be described.

When the phosphor wheel 6 is rotated, the plurality of fins 72, which are provided on the side opposite to the excitation light incident side of the phosphor wheel 6 and form the heat dissipater 7, generates the airflow, as shown in FIG. 7. Out of the airflow generated by the plurality of fins 72, a primary airflow is primarily the airflow AF, which flows from the center of the phosphor wheel 6 toward the periphery thereof, and the other airflow is not shown but flows from the phosphor wheel 6 toward the heat dissipating member 9A.

The airflow AF flows from the center of the phosphor wheel 6 toward the periphery thereof along the plurality of grooves 73 while heat is transferred from the plurality of fins 72 to the airflow AF. The airflow AF corresponds to a first airflow.

The airflow AF collides with an inner wall CA11, which forms part of the inner wall that forms the accommodation space CA1 and intersects with the flow direction of the airflow AF, and flows along the inner wall CA11 toward the heat receiving member 92. The airflow AF having flowed toward the heat receiving member 92 flows from the periphery of the heat receiving member 92 toward the center thereof along the surface 92A of the heat receiving member 92. Since the plurality of columnar protrusions 93A are disposed at the surface 92A, the airflow AF flowing along the surface 92A collides with the plurality of columnar protrusions 93A and flows toward placement section 921, which is disposed at the center of the surface 92A. The airflow AF then flows to the phosphor wheel 6 along the driver 8 located at the placement section 921, and flows to the center of the second surface 63B of the support substrate 63, which forms the phosphor wheel 6. The plurality of fins 72 then causes the airflow AF to flow again from the center of the phosphor wheel 6 toward the periphery thereof along the plurality of grooves 73.

Figure 8:
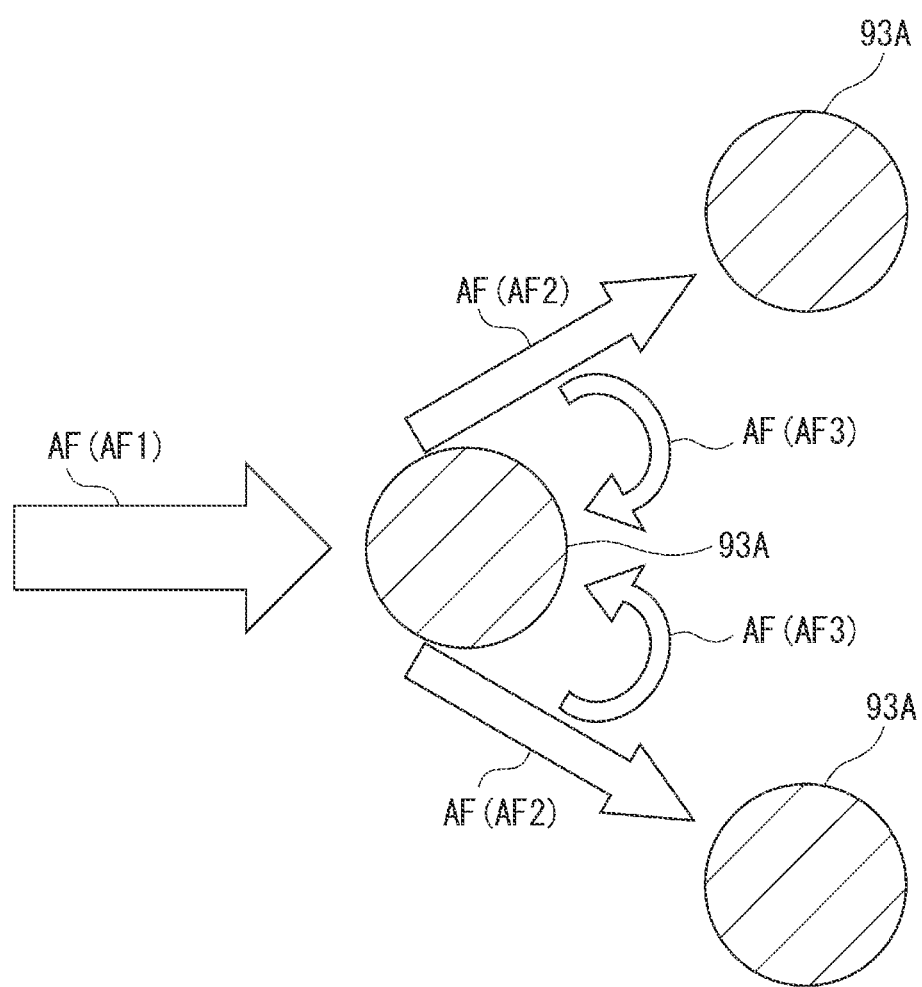
FIG. 8 is a diagrammatic view showing the airflow having collided with one columnar protrusion according to the first embodiment.

FIG. 8 is a diagrammatic view showing the airflow AF having collided with one of the columnar protrusions 93A.

The airflow AF having collided with one of the plurality of columnar protrusions 93A splits into two, which flow toward other columnar protrusions 93A, as shown in FIG. 8. That is, the columnar protrusions 93A each divide the airflow (first airflow) flowing to the columnar protrusion 93A out of the airflow AF (first airflow) generated by the rotation of the phosphor wheel 6 into a plurality of airflows AF2 (second airflow) flowing toward other columnar protrusions 93A. The airflow AF is thus allowed to readily flow to each of the plurality of columnar protrusions 93A, whereby the heat exchange between each of the columnar protrusions 93A and the airflow AF can be facilitated, and the heat can be readily transferred from the airflow AF to the columnar protrusions 93A.

When the columnar protrusions 93A each divide the airflow AF1 flowing thereto into the airflows AF2 flowing to other columnar protrusions 93A, the columnar protrusion 93A generates airflows AF3, which curl toward the surface of the columnar protrusion 93A opposite to the surface with which the airflow collides, as shown in FIG. 8. That is, turbulence occurs on a side of each of the columnar protrusions 93A, the side opposite to the side with which the airflow API collides. The airflow thus comes into contact with each of the columnar protrusions 93A over a large area, whereby the heat exchange between the columnar protrusion 93A and the airflow AF can be facilitated, and the heat can be readily transferred from the airflow AF to the columnar protrusion 93A.

The heat transferred to the columnar protrusions 93A is thus transferred to the heat sink 91 via the heat receiving member 92, as described above. Since the heat transferred to the heat sink 91 is dissipated out of the light source enclosure CA, the temperature in the accommodation space CA1, that is, the temperature of the gas flowing to the heat dissipater 7 provided at the phosphor wheel 6 can be lowered.

To cause the airflow Generated when the phosphor wheel 6 is rotated to flow efficiently toward the heat receiving member 92 after the airflow collides with the inner wall CA11, which forms the accommodation space CA1, so that the airflow circulates in the accommodation space CA1, it is preferable that the distance from the inner wall CA11, which forms the accommodation space CA1, to the outer circumference of the plurality of fins 72 provided at the phosphor wheel 6 is a predetermined distance.

According to results of research conducted by the present inventor, it is preferable that the distance from the axis of rotation Rx of the phosphor wheel 6 to the outer edge of the fins 72 is greater than or equal to 10% but smaller than or equal to 30% of the distance from the axis of rotation Rx to the inner wall CA11. The configuration in which the distance from the axis of rotation Rx to the outer edge of the fins 72 falls within the range described above allows the airflow AF to efficiently circulate in the space between the heat dissipater 7, which is the wheel-side heat dissipater, and the heat dissipating member 9A.

Effects of First Embodiment

The projector 1 according to the present embodiment described above provides the following effects.

The projector 1 includes the light source apparatus 4, the image formation apparatus 34, which forms image light by using the light outputted from the light source apparatus 4, and the projection optical apparatus 36, which projects the image light formed by the image formation apparatus 34.

The light source apparatus 4 includes the light source enclosure CA, the phosphor wheel 6, the heat dissipater 7, the driver 8, the heat sink 91, the heat receiving member 92, and the plurality of columnar protrusions 93A. The light source enclosure CA corresponds to the enclosure. The phosphor wheel 6 includes the phosphor layer 61, which converts the wavelength of light incident thereon and is disposed in the accommodation space CA1 of the light source enclosure CA. The phosphor layer corresponds to the phosphor. The heat dissipater 7 corresponds to the wheel-side heat dissipater. The heat dissipater 7 includes the plurality of fins 72 provided at the second surface 63B of the support substrate 63 of the phosphor wheel 6. The second surface 63B corresponds to one surface of the phosphor wheel 6. The plurality of fins 72 of the heat dissipater 7 generate an airflow when the phosphor wheel 6 rotates, and the airflow flows from the side facing the center of the phosphor wheel 6 toward the periphery thereof. The driver 8 rotates the phosphor wheel 6. The heat receiving member 92 includes the placement section 921, where the driver is placed. The heat receiving member 92 is disposed in a position where the heat receiving member 92 faces the heat dissipater 7. The heat receiving member 92 corresponds to the heat receiving member. The heat sink 91 is coupled in a heat transferable manner to a side of the heat receiving member 92, the side opposite to the phosphor wheel 6. The heat sink 91 is disposed outside the light source enclosure CA. The plurality of columnar protrusions 93A are provided around the placement section 921 so as to be capable of transferring heat to the heat receiving member 92. The plurality of columnar protrusions 93A protrude into the accommodation space CA1 of the light source enclosure CA toward the plurality of fins 72. The plurality of columnar protrusions 93A are each so configured that the dimension along a protrusion direction in which the columnar protrusion 93A protrudes is greater than the dimension in the direction perpendicular to the protrusion direction. Out of the plurality of columnar protrusions 93A, a columnar protrusion 93A disposed upstream of the airflow flowing to the plurality of columnar protrusions 93A divides the airflow toward other columnar protrusions 93A located downstream of the airflow.

According to the configuration described above, when the phosphor wheel 6 is rotated by the driver 8, an airflow flowing from the center of the phosphor wheel 6 toward the periphery thereof is generated by the plurality of fins 72 of the heat dissipater 7. Since the heat of the phosphor wheel 6, that is, the heat generated in the phosphor layer 61, is transferred from the plurality of fins 72 to the airflow, the phosphor layer 61 can be cooled.

The airflow generated by the rotation of the phosphor wheel 6 flows to the heat receiving member 92 disposed in a position where the heat receiving member 92 faces the heat dissipater 7. The plurality of columnar protrusions 93A, which protrude into the light source enclosure CA toward the plurality of fins 72, are provided around the placement section 921 of the heat receiving member 92. Since the plurality of columnar protrusions 93A are coupled to the heat receiving member 92 in a heat transferable manner, the heat received by the plurality of columnar protrusions 93A is transferred to the heat sink 91 via the heat receiving member 92 and dissipated out of the light source enclosure CA. As a result, the temperature in the accommodation space CA1 of the light source enclosure CA can be lowered, and the temperature of the airflow flowing to the plurality of fins 72 can be lowered, whereby the phosphor layer 61 of the phosphor wheel 6 can be cooled at increased cooling efficiency.

Furthermore, the heat receiving member 92 is disposed in a position where the heat receiving member 92 faces the heat dissipater 7. The plurality of columnar protrusions 93A, which are coupled to the heat sink 91 in a heat transferable manner via the heat receiving member 92, protrude toward the plurality of fins 72. The heat sink 91 is coupled in a heat transferable manner to a side of the heat receiving member 92, the side opposite to the phosphor wheel 6. The number of components that protrude out of the light source enclosure CA, except the heat sink 91, can therefore be reduced. An increase in size of the light source apparatus 4 can thus be suppressed as compared with the configuration in which a heat sink is provided at each of a plurality of side surfaces of the light source enclosure CA.

The cooling efficiency at which the light source apparatus 4 is cooled and an increase in the size of the light source apparatus 4 can therefore be suppressed.

In the light apparatus 4, the plurality of columnar protrusions 93A each Generate turbulence (airflow AF3) that collides with the surface of the columnar protrusion 93A opposite to the surface with which the airflow collides.

The configuration described above allows an increase in the contact area where the heated airflow having flowed through the heat dissipater 7 comes into contact with the columnar protrusions 93A. The heat transfer from the airflow to the columnar protrusions 93A can therefore be facilitated, whereby the phosphor layer 61 can be cooled at increased cooling efficiency.

In the light source apparatus 4, the heat receiving member 92 includes the wiring placement section 922, where the wiring FPC coupled to the driver 8 is placed. The plurality of columnar protrusions 93A are provided at the surface 92A of the heat receiving member 92 except the wiring placement section 922.

The configuration described above prevents the wiring FPC coupled to the driver 8 from being in contact with the columnar protrusions 93A, to which the heat of the phosphor layer 61 is transferred via the airflow. The influence of the heat on the wiring FPC and the driver 8 can therefore be suppressed.

The light source apparatus 4 includes the light source enclosure CA, the phosphor wheel 6, the heat dissipater 7, the driver 8, and the heat dissipating member 9A. The light source enclosure CA corresponds to the enclosure. The phosphor wheel 6 includes the phosphor layer 61, which converts the wavelength of the light incident thereon. The phosphor layer 61 corresponds to the phosphor. The phosphor wheel 6 is disposed in the accommodation space CA1 of the light source enclosure CA. The heat dissipater 7 corresponds to the wheel-side heat dissipater. The heat dissipater 7 includes the plurality of fins 72 provided at the second surface 63B of the support substrate 63 of the phosphor wheel 6. The second surface 63B corresponds to one surface of the phosphor wheel 6. The plurality of fins 72 of the heat dissipater 7 generate an airflow when the phosphor wheel 6 rotates, and the airflow flows from the side facing the center of the phosphor wheel 6 toward the periphery thereof. The driver 8 rotates the phosphor wheel 6. The heat dissipating member 9A faces the heat dissipater 7. The heat dissipating member 9A includes the placement section 921, the heat sink 91, and the plurality of columnar protrusions 93A. The driver 8 is placed at the placement section 921. The heat sink 91 is disposed on a side of the placement section 921, the side opposite to the phosphor wheel 6, and disposed outside the light source enclosure CA. The plurality of columnar protrusions 93A are provided around the placement section 921 and protrude into the accommodation space CA1 of the light source enclosure CA toward the plurality of fins 72. The plurality of columnar protrusions 93A are each so configured that the dimension along the protrusion direction is greater than the dimension in the direction perpendicular to the protrusion direction. Out of the plurality of columnar protrusions 93A, a columnar protrusion 93A disposed upstream of the airflow flowing to the plurality of columnar protrusions 93A divides the airflow toward the columnar protrusions 93A disposed downstream of the airflow.

The configuration described above can provide the effects described above.

Second Embodiment

A second embodiment of the present disclosure will next be described.

The projector according to the present embodiment has the same configuration as that of the projector according to the first embodiment but differs therefrom in terms of the configuration of the plurality of columnar protrusions provided at the heat receiving member that form the heat dissipating member. In the following description, portions that are the same or substantially the same as the portions having been already described have the same reference characters and will not be described.

Schematic Configuration of Projector and Light Source Apparatus

Figure 9:
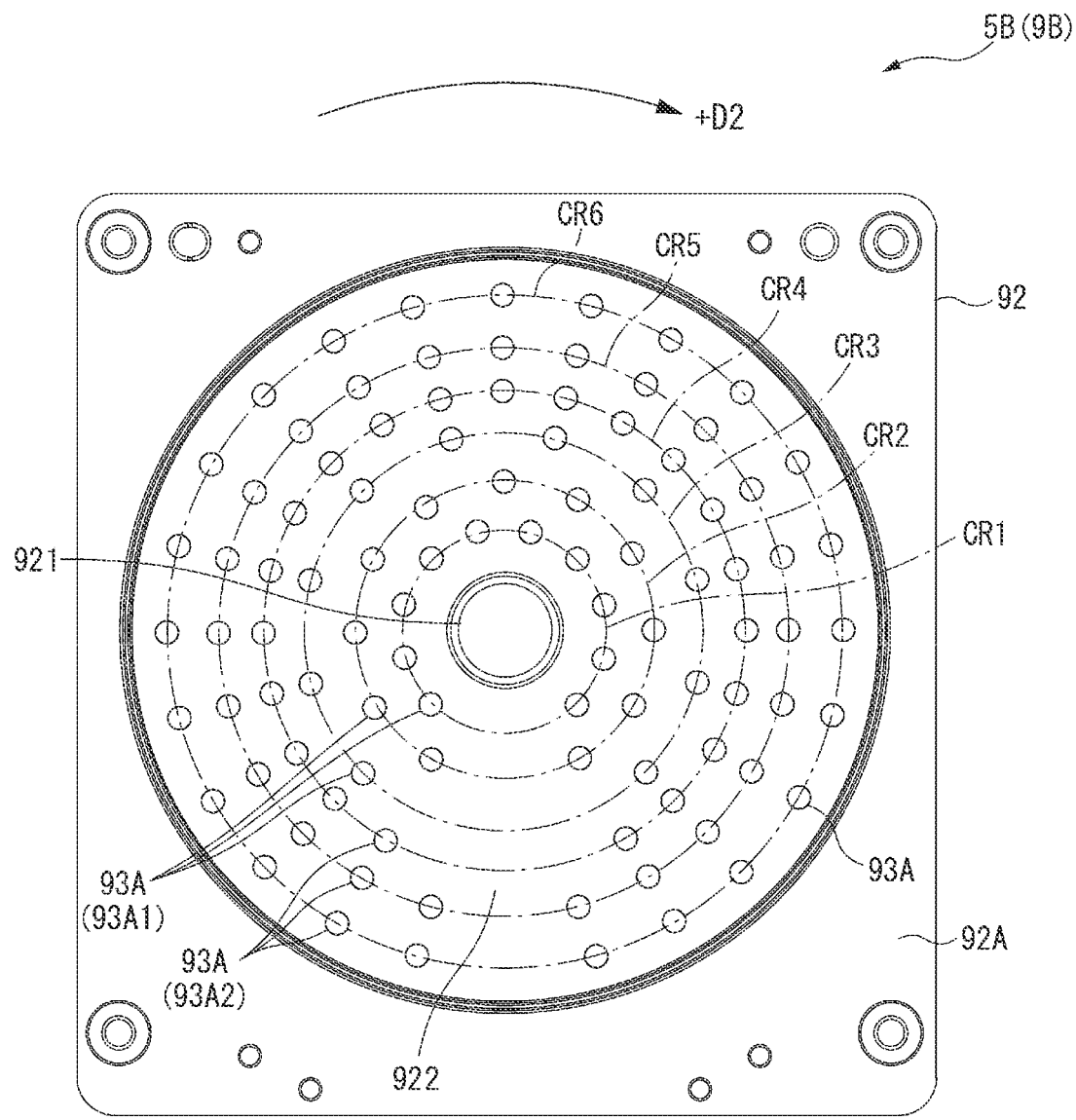
FIG. 9 is a plan view of the heat dissipating member of the light source apparatus provided in the projector according to a second embodiment viewed from the excitation light incident side.

FIG. 9 is a plan view of a heat dissipating member 9B of the light source apparatus provided in the projector according to the present embodiment viewed from the excitation light incident side.

The projector according to the present embodiment has the same configuration and function as those of the projector 1 according to the first embodiment except that the wavelength conversion apparatus 5A according to the first embodiment is replaced with a wavelength conversion apparatus 5B shown in FIG. 9. That is, the light source apparatus according to the present embodiment has the same configuration and function as those of the light source apparatus 4 according to the first embodiment except that the wavelength conversion apparatus 5A is replaced with the wavelength conversion apparatus 5B.

The wavelength conversion apparatus 5B has the same configuration and function as those of the wavelength conversion apparatus 5A except that the heat dissipating member 9A is replaced with the heat dissipating member 9B. That is, the wavelength conversion apparatus 5B includes the phosphor wheel 6, the heat dissipater 7, the driver 8, and the heat dissipating member 9B.

Configuration of Heat Dissipating Member

The heat dissipating member 9B includes the heat sink 91, the heat receiving member 92, and the plurality of columnar protrusions 93A, as the heat dissipating member 9A according to the first embodiment does. In the heat dissipating member 9B, however, the arrangement of the plurality of columnar protrusions 93A differs from the arrangement of the plurality of columnar protrusions 93A in the heat dissipating member 9A, as shown in FIG. 9.

Specifically, in the heat dissipating member 9B, the plurality of columnar protrusions 93A are provided around the placement section 921 so as to be capable of transferring heat to the surface 92A of the heat receiving member 92, and protrude into the accommodation space CA1 of the light source enclosure CA toward the plurality of fins 72 of the heat dissipater 7, as the plurality of columnar protrusions 93A according to the first embodiment are. The plurality of columnar protrusions 93A receive the heat from the airflow AF generated by the plurality of fins 72 in the accommodation space CA1 when the phosphor wheel 6 rotates, and transfer the received heat to the heat sink 91 via the heat receiving member 92.

In the heat dissipating member 9B, a plurality of reference circles CR1 to CR6, which are concentric circles disposed around the placement section 921 at substantially equal intervals, are set at the surface 92A. The reference circles CR1 to CR6 are imaginary concentric circles, and the reference circles CR1, CR2, CR3, CR4, CR5, and CR6 are set in this order outward from the placement section 921.

The plurality of columnar protrusions 93A are provided at equal intervals in the circumferential direction. (direction +D2) around the placement section 921, on the reference circles CR1 to CR6.

Specifically, columnar protrusions 93A1 disposed on the reference circles CR1 to CR3, which face the placement section 921, are provided around the placement section 921 at first angular intervals based on a first angle. In the present embodiment, the first angle is 30°, and the columnar protrusions 93A disposed on the reference circles CR1 to CR3 are the first columnar protrusions 93A1. The cycle of the arrangement of the first columnar protrusions 93A1 disposed on the reference circles CR1 and CR3 is out of phase by 15° with respect to the cycle of the arrangement of the first columnar protrusions 93A1 disposed on the reference circles CR2. The phase shift angle is half the placement angle at which the first columnar protrusions 93A1 are placed around the placement section 921 on each of the reference circles CR1 to CR3. The first angle is the angle between the straight line that connects the center of the reference circles CR1 to CR3, which is also the center of the placement section 921, to one of the first columnar protrusions 93A1 and the straight line that connects the center of the reference circles CR1 to CR3 to a first columnar protrusion 93A1 adjacent to the one first columnar protrusion 93A1.

The columnar protrusions 93A disposed on the outer reference circles CR4 to CR6 with respect to the placement section 921 are provided around the placement section 921 at second angular intervals based on a second angle. In the present embodiment, the second angle is 15°, and the columnar protrusions 93A disposed on the reference circles CR4 to CR6 are second columnar protrusions 93A2. The cycles of the arrangements of the second columnar protrusions 93A2 disposed on the reference circles CR4 to CR6 have the same phase. The second angle is the angle between the straight line that connects the center of the reference circles CR4 to CR6, which is also the center of the placement section 921, to one of the second columnar protrusions 93A2 and the straight line that connects the center of the reference circles CR4 to CR6 to a second columnar protrusion 93A2 adjacent to the one second columnar protrusion 93A2.

As described above, in the wavelength conversion apparatus 5B, the plurality of columnar protrusions 93A include the plurality of first columnar protrusions 93A1 disposed on the side facing the placement section 921 when viewed from the phosphor wheel 6 and the plurality of second columnar protrusions 93A2 disposed outside the plurality of first columnar protrusions 93A1 when viewed from the phosphor wheel 6. The angular intervals at which the first columnar protrusions 93A1 are disposed around the placement section 921 (first angular intervals based on first angle) differs from the angular intervals at which the second columnar protrusions 93A2 are disposed around the placement section 921 (second angular intervals based on second angle). In detail, the second angle is smaller than the first angle.

Figure 10:
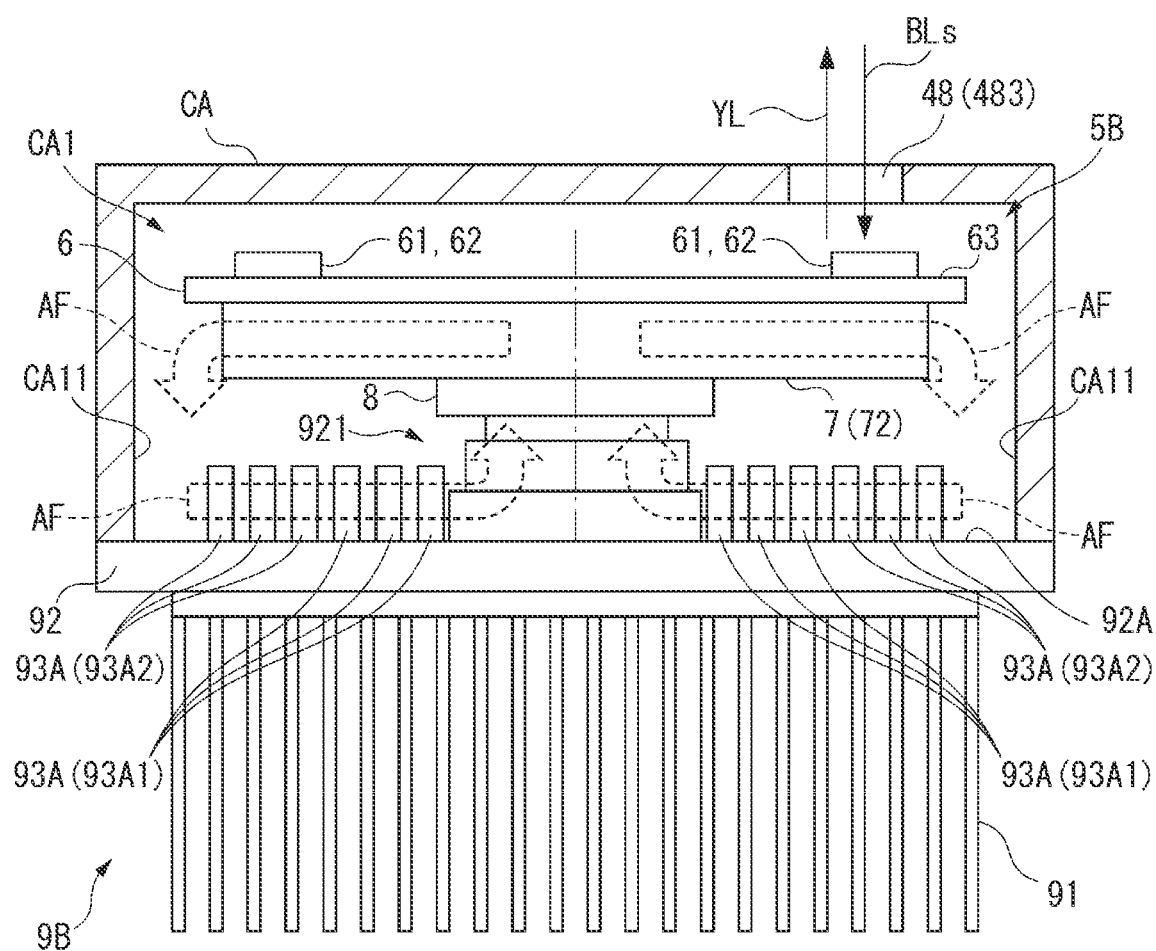
FIG. 10 is a diagrammatic view showing the airflow in the accommodation space according to the second embodiment.

FIG. 10 diagrammatically shows a cross section of the wavelength conversion apparatus 5B. In other words, FIG. 10 is a diagrammatic view showing the airflow AF in the accommodation space CA1.

The plurality of second columnar protrusions 93A2 are provided in accordance with the region where the phosphor layer 61 of the phosphor wheel 6 is provided, as shown in FIG. 10. In detail, when the wavelength conversion apparatus 5B is viewed from the excitation light incident side, the plurality of second columnar protrusions 93A2 are provided in accordance with the region where the phosphor layer 61 is provided. The plurality of fins 72 are disposed at the second surface 63B of the support substrate 63 so as to cover the region according to the phosphor layer 61 provided at the first surface 63A.

Also in the light source apparatus including the thus configured heat dissipating member 9B, when the phosphor wheel 6 is rotated, the plurality of fins 72 provided at the phosphor wheel 6 primarily generates the airflow AF flowing from the center of the phosphor wheel 6 toward the periphery thereof. The airflow AF flows along the inner wall CA11, which forms the accommodation space CA1, to the heat receiving member 92, which faces the plurality of fins 72, as in the first embodiment. The airflow AF having flowed to the heat receiving member 92 flows through the gaps between the plurality of second columnar protrusions 93A2 and the gaps between the plurality of first columnar protrusions 93A1 along the surface 92A toward the placement section 921 while colliding with the plurality of second columnar protrusions 93A2 and the plurality of first columnar protrusions 93A1. In this process, the heat is transferred from the airflow AF to the plurality of columnar protrusions 93A. The cooled airflow AF after flowing through the gaps between the plurality of columnar protrusions 93A is sucked by the plurality of fins 72.

Effects of Second Embodiment

The projector according to the present embodiment described above can provide the effects below as well as the same effects as those provided by the projector 1 according to the first embodiment.

In the light source apparatus according to the present embodiment, the plurality of columnar protrusions 93A include the plurality of first columnar protrusions 93A1 disposed on the side facing the placement section 921 when viewed from the phosphor wheel 6 and the plurality of second columnar protrusions 93A2 disposed outside the plurality of first columnar protrusions 93A1 when viewed from, the phosphor wheel 6.

When the airflow AF generated by the plurality of fins 72 when the phosphor wheel 6 rotates flows along the heat receiving member 92, the airflow AF flows from the region outside the heat receiving member 92 toward the placement section 921.

The airflow AF is thus allowed to readily flow along each of the second columnar protrusions 93A2 and the first columnar protrusions 93A1 when the airflow AF flows toward the placement section 921. The heat is thus readily transferred from the airflow AF to the columnar protrusions 93A. The airflow AF and in turn the phosphor layer 61 can therefore be cooled at increased cooling efficiency.

In the light source apparatus according to the present embodiment, the plurality of first columnar protrusions 93A1 and the plurality of second columnar protrusions 93A2 are arranged concentrically around the placement section 921. The plurality of first columnar protrusions 93A1 are provided at the first angular intervals based on the first angle around the placement section 921. The plurality of second columnar protrusions 93A2 are provided at the second angular intervals based on the second angle around the placement section 921. The first angle differs from the second angle. In detail, the second angle is smaller than the first angle.

According to the configuration described above, the number of second columnar protrusions 93A2 disposed on the outer side can be greater than the number of first columnar protrusions 93A1 located on the side facing the placement section 921. Since the number of first columnar protrusions 93A1 smaller than the number of second columnar protrusions 93A2, the gap between the plurality of first columnar protrusions 93A1 can be increased. The airflow AF can thus be caused to flow to the plurality of second columnar protrusions 93A2 to facilitate the heat transfer from the airflow AF to the second columnar protrusions 93A2, and also caused to readily flow through the gaps between the plurality of first columnar protrusions 93A1. The temperature of the airflow AF flowing to the heat dissipater 7, to which the heat of the phosphor layer 61 is transferred, can therefore be lowered, whereby the phosphor layer 61 can be cooled at increased cooling efficiency.

In the light source apparatus according to the present embodiment, the plurality of second columnar protrusions 93A2 are disposed in correspondence with the region where the phosphor layer 61 is provided in the phosphor wheel 6.

When the phosphor wheel 6 rotates, the airflow AF primarily flows in the direction from the center of the phosphor wheel 6 toward the periphery thereof, and the airflow AF flows also in the direction from the plurality of fins 72 toward the heat receiving member 92.

The aforementioned arrangement of the plurality of second columnar protrusions 93A2 therefore allows the heat generated in the phosphor layer 61 to be readily transferred via the airflow AF to the plurality of second columnar protrusions 93A2. The heat generated in the phosphor layer 61 can therefore be readily transferred to the columnar protrusions 93A in positions away from the placement section 921, where the driver 8 is placed.

Third Embodiment

A third embodiment of the present disclosure will next be described.

The projector according to the present embodiment has the same configuration as that of the projector 1 according to the first embodiment but differs therefrom in terms of the configuration of the plurality of columnar protrusions. In the following description, portions that are the same or substantially the same as the portions having been already described have the same reference characters and will not be described.

Schematic Configuration of Projector and Light Source Apparatus

Figure 11:
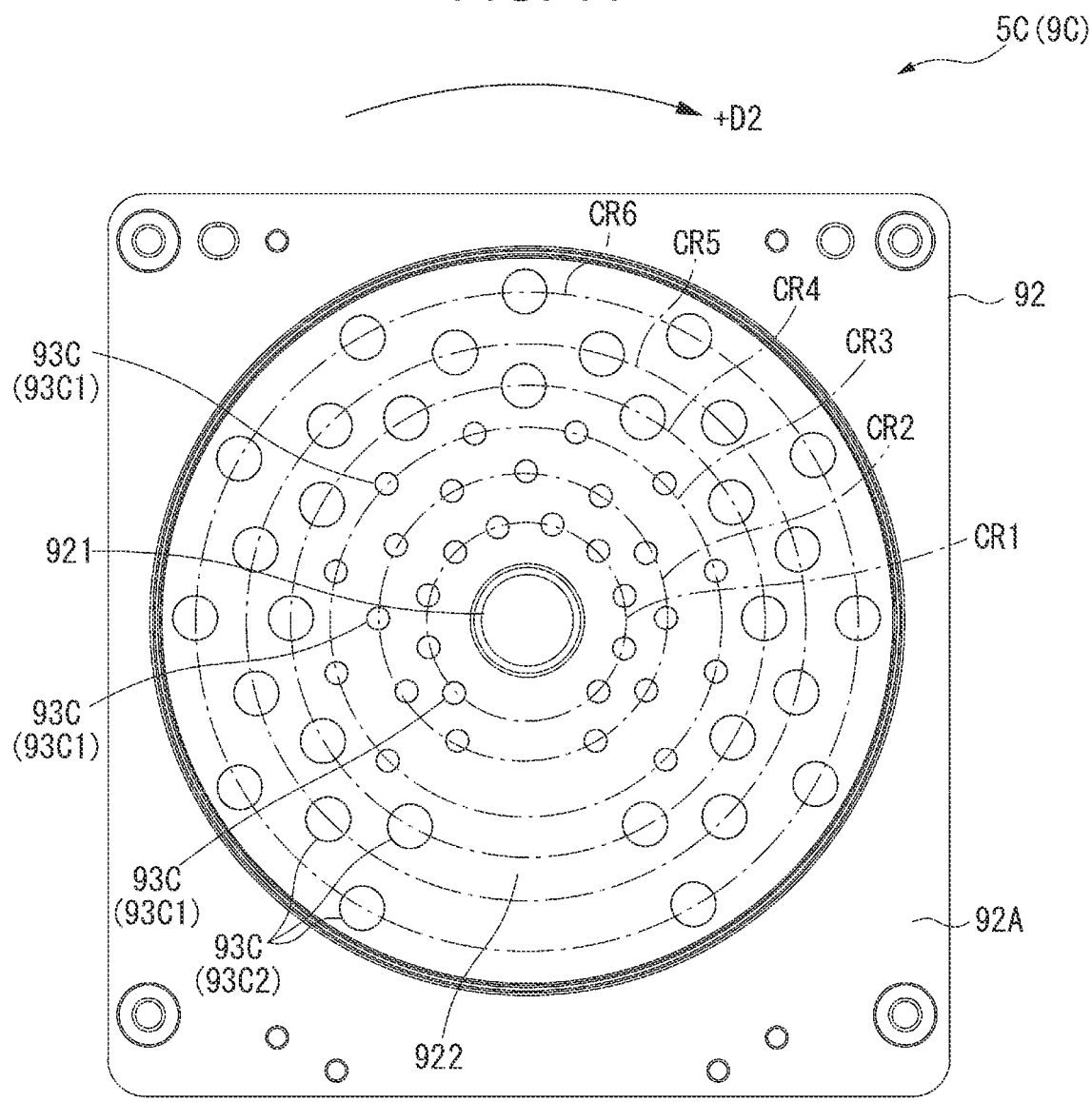
FIG. 11 is a plan view of the heat dissipating member of the light source apparatus provided in the projector according to a third embodiment viewed from the excitation light incident side.

FIG. 11 is a plan view of a heat dissipating member 9C of the light source apparatus provided in the projector according to the present embodiment viewed from the excitation light incident side.

The projector according to the present embodiment has the same configuration and function as those of the projector 1 according to the first embodiment except that the wavelength conversion apparatus 5A according to the first embodiment is replaced with a wavelength conversion apparatus 5C shown in FIG. 11. That is, the light source apparatus according to the present embodiment has the same configuration and function as those of the light source apparatus 4 according to the first embodiment except that the wavelength conversion apparatus 5A is replaced with the wavelength conversion apparatus 5C.

The wavelength conversion apparatus 5C has the same configuration and function as those of the wavelength conversion apparatus 5A except that the heat dissipating member 9A is replaced with the heat dissipating member 9C. That is, the wavelength conversion apparatus 50 includes the phosphor wheel 6, the heat dissipater 7, the driver 8, and the heat dissipating member 9C.

Configuration of Heat Dissipating Member

The heat dissipating member 9C the same configuration and function as those of the heat dissipating member 9B according to the second embodiment but differs therefrom in that the plurality of columnar protrusions 93A are replaced with a plurality of columnar protrusions 93C. That is, the heat dissipating member 9C includes the heat sink 91, the heat receiving member 92, and the plurality of columnar protrusions 93C.

The plurality of columnar protrusions 93C are provided around the placement section 921 so as to be capable of transferring heat to the surface 92A of the heat receiving member 92, and protrude into the accommodation space CA1 of the light source enclosure CA toward the plurality of fins 72 of the heat dissipater 7, as shown in FIG. 11. The plurality of columnar protrusions 93C receive the heat from the airflow AF generated by the plurality of fins 72 in the accommodation space CA1 when the phosphor wheel 6 rotates, and transfer the received heat to the heat sink 91 via the heat receiving member 92.

The plurality of reference circles CR1 to CR6, which are concentric circles disposed around the placement section 921 at substantially equal intervals, are set at the surface 92A of the heat receiving member 92 of the heat dissipating member 9C, as in the case of the heat receiving member 92 of the heat dissipating member 9B.

The plurality of columnar protrusions 93C are equally spaced from each other in the circumferential direction (direction +D2) around the placement section 921 on the reference circles CR1 to CR6.

Specifically, the plurality of columnar protrusions 93C disposed on the reference circles CR1 to CR3, which face the placement section 921, are first columnar protrusions 93C1 provided around the placement section 921 at the first angular intervals based on the first angle. In the present embodiment, the first angle is 30°. The cycle of the arrangement of the first columnar protrusions 93C1 disposed on the reference circles CR1 and CR3 is out of phase by 15° with respect to the cycle of the arrangement of the first columnar protrusions 93C1 disposed on the reference circles CR2, but not necessarily. The first angle may be any other angle, and the cycles of the arrangements of the first columnar protrusions 93C1 disposed on the reference circles CR1, CR2, and CR3 may have the same phase.

The plurality of columnar protrusions 93C disposed on the outer reference circles CR4 to CR6 with respect to the placement section 921 are second columnar protrusions 93C2 provided around the placement section 921 at the second angular intervals based on the second angle. In the present embodiment, the second angle is 30°, which is equal to the first angle.

The area of a cross section of each of the second columnar protrusions 93C2, the cross section perpendicular to the direction in which the second columnar protrusions 93C2 protrude from the surface 92A, is greater than the area of a cross section of the first columnar protrusions 93C1, the cross section perpendicular to the direction in which the first columnar protrusions 93C1 protrude from the surface 92A.

In other words, the area of a cross section of each of the second columnar protrusions 93C2, the cross section perpendicular to the direction in which the second columnar protrusions 93C2 protrude into the accommodation space CA1, is greater than the area of a cross section of each of the first columnar protrusions 93C1, the cross section perpendicular to the protrusion direction.

The cycle of the arrangement of the second columnar protrusions 93C2 disposed on the reference circles CR4 and CR6 is out of phase by 15° with respect to the cycle of the arrangement of the second columnar protrusions 93C2 disposed on the reference circles CR5, but not necessarily. The second angle may be any other angle, and the phase of the arrangements of the first columnar protrusions 93C1 disposed on the reference circles CR4, CR5, and CR6 may have the same cycle. The second angle may be smaller than the first angle or greater than the first angle.

The plurality of columnar protrusions 93C include the plurality of first columnar protrusions 93C1 and the plurality of second columnar protrusions 93C2 as described above. The plurality of first columnar protrusions 93C1 are disposed on the side facing the placement section 921 when viewed from the phosphor wheel 6. The plurality of second columnar protrusions 93C2 are disposed outside the plurality of first columnar protrusions 93C1 when viewed from the phosphor wheel 6, and the area of the aforementioned cross section of each of the second columnar protrusions 93C2 is greater than the area of the aforementioned cross section of each of the first columnar protrusions 93C1.

The comparison is not limited to the comparison in terms of cross-sectional area, and the volume of each of the first columnar protrusions may be compared with the volume of each of the second columnar protrusions. In this case, the volume of each of the second columnar protrusions 93C2 may be greater than the volume of each of the first columnar protrusions 93C1.

The plurality of second columnar protrusions 93C2 are provided in accordance with the region where the phosphor layer 61 of the phosphor wheel 6 is provided, as the plurality of second columnar protrusions 93A2 according to the second embodiment are. In detail, when the wavelength conversion apparatus 5C is viewed from the excitation light incident side, the plurality of second columnar protrusions 93C2 are provided in accordance with the region where the phosphor layer 61 is provided. The plurality of fins 72 are disposed at the second surface 63B of the support substrate 63 so as to cover the region according to the phosphor layer 61 provided at the first surface 63A.

Also in the light source apparatus including the thus configured heat dissipating member 9C, when the phosphor wheel 6 is rotated, the plurality of fins 72 provided at the phosphor wheel 6 primarily generates the airflow AF flowing from the center of the phosphor wheel 6 toward the periphery thereof. The airflow AF flows along the inner wall CA11, which forms the accommodation space CA1, to the heat receiving member 92, which faces the plurality of fins 72, as in the first embodiment. The airflow AF having flowed to the heat receiving member 92 flows through the gaps between the plurality of second columnar protrusions 93C2 and the gaps between the plurality of first columnar protrusions 93C1 along the surface 92A toward the placement section 921 while colliding with the plurality of second columnar protrusions 93C2 and the plurality of first columnar protrusions 93C1. In this process, the heat is transferred from the airflow AF to the plurality of columnar protrusions 93C. The cooled airflow AF after flowing through the gaps between the plurality of columnar protrusions 93C is sucked by the plurality of fins 72.

Effects of Third Embodiment

The projector according to the present embodiment described above can provide the effects below as well as the same effects as those provided by the projectors according to the first and second embodiments.

In the light source apparatus according to the present embodiment, the area of a cross section of each of the second columnar protrusions 93C2, the cross section perpendicular to the direction in which the second columnar protrusions 93C2 protrude into the accommodation space CA1 of the light source enclosure CA, is greater than the area of a cross section of each of the first columnar protrusions 93C1, the cross section perpendicular to the protrusion direction.

When the cross section of each of the first columnar protrusions disposed on the side facing the placement section 921 has a large area, the distance between the plurality of first columnar protrusions decreases, so that the airflow AF in the portion facing the placement section 921 in the heat receiving member 92 is likely to be blocked.

In contrast, when the area of the aforementioned cross section of each of the second columnar protrusions 93C2 is greater than the area of the aforementioned cross section of each of the first columnar protrusions 93C1, the heat can be readily transferred from the airflow AF to the columnar protrusions 93C in an outer portion of the heat receiving member 92, the portion where the airflow AF readily flows.

The temperature of the airflow AF flowing to the heat dissipater 7 can therefore be lowered, whereby the phosphor layer 61 can be cooled at increased cooling efficiency.

Fourth Embodiment

A fourth embodiment of the present disclosure will next be described.

The projector according to the present embodiment has the same configuration as that of the projector 1 according to the first embodiment but differs therefrom in terms of the configuration of the plurality of columnar protrusions of the heat dissipating member. In detail, out of the plurality of columnar protrusions according to the present embodiment, the second columnar protrusions are provided in positions closer to the phosphor wheel and the heat dissipater than the first columnar protrusions. In the following description, portions that are the same or substantially the same as the portions having been already described have the same reference characters and will not be described.

Schematic Configuration of Projector and Light Source Apparatus

Figure 12:
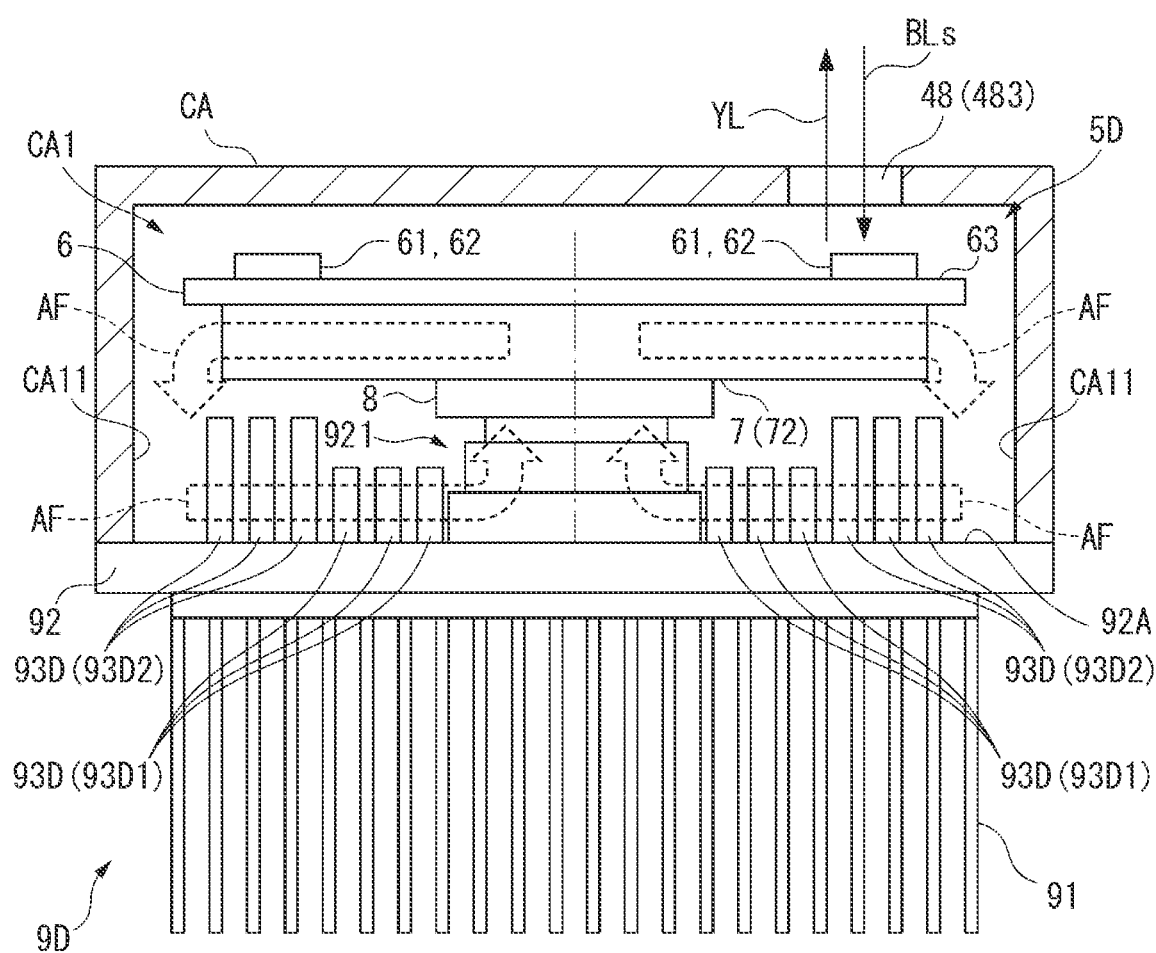
FIG. 12 diagrammatically shows a cross section of the wavelength conversion apparatus of the light source apparatus provided in the projector according to a fourth embodiment.

FIG. 12 diagrammatically shows a cross section of a wavelength conversion apparatus 5D of the light source apparatus provided in the projector according to the present embodiment.

The projector according to the present embodiment has the same configuration and function as those of the projector 1 according to the first embodiment except that the wavelength conversion apparatus 5A according to the first embodiment is replaced with the wavelength conversion apparatus 5D shown in FIG. 12. That is, the light source apparatus according to the present embodiment has the same configuration and function as those of the light source apparatus 4 according to the first embodiment except that the wavelength conversion apparatus 5A is replaced with the wavelength conversion apparatus 5D.

The wavelength conversion apparatus 5D has the same configuration and function as those of the wavelength conversion apparatus 5A except that the heat dissipating member 9A is replaced with a heat dissipating member 9D. That is, the wavelength conversion apparatus 5D includes the phosphor wheel 6, the heat dissipater 7, the driver 8, and the heat dissipating member 9D.

Configuration of Heat Dissipating Member

The heat dissipating member 9D has the same configuration and function as those of the heat dissipating member 9B according to the second embodiment but differs therefrom in that the plurality of columnar protrusions 93A are replaced with a plurality of columnar protrusions 93D. That is, the heat dissipating member 9D includes the heat sink 91, the heat receiving member 92, and the plurality of columnar protrusions 93D.

The plurality of columnar protrusions 93D are provided around the placement section 921 so as to be capable of transferring heat to the surface 92A of the heat receiving member 92, and protrude into the accommodation space CA1 of the light source enclosure CA toward the plurality of fins 72 of the heat dissipater 7, as shown in FIG. 12. The plurality of columnar protrusions 93D receive the heat from the airflow AF generated by the plurality of fins 72 when the phosphor wheel 6 rotates in the accommodation space CA1, and transfer the received heat to the heat sink 91 via the heat receiving member 92.

Although not shown, the plurality of reference circles CR1 to CR6, which are concentric circles disposed at substantially equal intervals around the placement section 921, are set at the surface 92A of the heat receiving member 92 of the heat dissipating member 9D, as in the case of the heat receiving member 92 of the heat dissipating member 9B. The plurality of reference circles CR1 to CR6 are imaginary concentric circles. The plurality of columnar protrusions 93D include a plurality of first columnar protrusions 93D1 disposed around the placement section 921 at the first angular intervals based on the first angle on the reference circles CR1 to CR3 facing the placement section 921 and a plurality of second columnar protrusions 93D2 disposed around the placement section 921 at, the second angular intervals based on the second angle on the reference circles CR4 to CR6 set outside the reference circles CR1 to CR3. That is, the plurality of columnar protrusions 93D include the plurality of first columnar protrusions 93D1 disposed on the side facing the placement section 921 when viewed from the phosphor wheel and the plurality of second columnar protrusions 93D2 disposed outside the plurality of first columnar protrusions 93D1 when viewed from the phosphor wheel 6.

The first and second angles can be changed as appropriate, and the second angle may be equal to or different from the first angle. In the latter case, the second angle may be smaller than the first angle or greater than the first angle.

In the present embodiment, the dimension in the direction in which the second columnar protrusions 93D2 protrude into the accommodation space CA1 is greater than the dimension in the direction in which the first columnar protrusions 93D1 protrude into the accommodation space CA1. In other words, the dimension of the second columnar protrusions 93D2 in the direction in which the second columnar protrusions 93D2 protrude from the heat receiving member 92 is greater than the dimension of the first columnar protrusions 93D1 in the direction in which the first columnar protrusions 93D1 protrude from the heat receiving member 92. That is, the distance between each of the plurality of second columnar protrusions 93D2 and the heat dissipater 7 is smaller than the distance between each of the plurality of first columnar protrusions 93D1 and the heat dissipater 7. Furthermore, the distance between each of the plurality of second columnar protrusions 93D2 and the phosphor wheel 6 is smaller than the distance between each of the plurality of first columnar protrusions 93D1 and the phosphor wheel 6.

The dimension of the first columnar protrusions 93D1 in the direction in which the first columnar protrusions 93D1 protrude into the accommodation space CA1 is greater than the dimension of the first columnar protusions 93D1 in the direction perpendicular to the direction in which the first columnar protrusions 93D1 protrude into the accommodation space CA1 (outer diameter). The dimension of the second columnar protrusions 93D2 in the direction in which the second columnar protrusions 93D2 protrude into the accommodation space CA1 is greater than the dimension of the second columnar protrusions 93D2 in the direction perpendicular to the direction in which the second columnar protrusions 93D2 protrude into the accommodation space CA1 (outer diameter).

In the present embodiment, the area of a cross section of each of the first columnar protrusions 93D1, the cross section perpendicular to the direction in which the first columnar protrusions 93D1 protrude into the accommodation space CA1, is equal to the area of a cross section of the second columnar protrusions 93D2, the cross section perpendicular to the direction in which the second columnar protrusions 93D2 protrude into the accommodation space CA1, but not necessarily. The area of the aforementioned cross section of each of the first columnar protrusions 93D1 may differ from the area of the aforementioned cross section of each of the second columnar protrusions 93D2. For example, the area of the aforementioned cross section of each of the second columnar protrusions 93D2 may be greater than the area of the aforementioned cross section of each of the first columnar protrusions 93D1, as in the case of the first columnar protrusions 93C1 and the second columnar protrusions 93C2.

Also in the light source apparatus including the thus configured heat dissipating member 9D, when the phosphor wheel 6 is rotated, the plurality of fins 72 provided at the phosphor wheel 6 primarily generates the airflow AF flowing from the center of the phosphor wheel 6 toward the periphery thereof. The airflow AF flows along the inner wall CA11, which forms the accommodation space CA1, to the heat receiving member 92, which faces the plurality of fins 72, as in the first embodiment. The airflow AF having flowed to the heat receiving member 92 flows through the gaps between the plurality of second columnar protrusions 93D2 and the gaps between the plurality of first columnar protrusions 93D1 along the surface 92A toward the placement section 921 while colliding with the plurality of second columnar protrusions 93D2 and the plurality of first columnar protrusions 93D1. In this process, the heat is transferred from the airflow AF to the plurality of columnar protrusions 93D. The cooled airflow AF after flowing through the gaps between the plurality of columnar protrusions 93D is sucked by the plurality of fins 72.

Furthermore, the distance between each of the plurality of second columnar protrusions 9312 and the heat dissipater 7 is smaller than the distance between each of the plurality of first columnar protrusions 93D1 and the heat dissipater 7. That is, the area where the airflow AF comes into contact with the second columnar protrusions 93D2 is greater than the area where the airflow AF comes into contact with the first columnar protrusions 93D1. The heat of the airflow AF can therefore be transferred to the heat receiving member 92 and the heat sink 91 via the columnar protrusions 93D in an outer portion away from the placement section 921.

Effects of Fourth Embodiment

The projector according to the present embodiment described above can provide the effects below as well as the same effects as those provided by the projectors according to the first to third embodiments.

In the light source apparatus according to the present embodiment, the distance between each of the plurality of second columnar protrusions 93D2 and the heat dissipater 7 is smaller than the distance between each of the plurality of first columnar protrusions 93D1 and the heat dissipater 7. The heat dissipater 7 corresponds to the wheel-side heat dissipater.

According to the configuration described above, the heat can be readily transferred to the columnar protrusions 93D from the heat dissipater 7 via the airflow AF in positions away from the placement section 921, where the driver 8 is placed. The heat transfer to the driver 8 can therefore be suppressed, whereby the influence of the heat on the driver 8 can be suppressed.

Variations of Embodiments

The present disclosure is not limited to the embodiments described above, and variations, improvements, and other modifications to the extent that the advantage of the present disclosure is achieved fall within the scope of the present disclosure.

In each of the embodiments described above, the heat dissipater 7 includes the heat transfer substrate 71, which is provided at the second surface 63B opposite to the first surface 63A, at which the phosphor layer 61 is provided, in the support substrate 63 of the phosphor wheel 6, and the plurality of fins 72, which rise from the heat transfer substrate 71, but not necessarily. The heat transfer substrate 71 may be omitted, and the plurality of fins 72 may be provided directly at the second surface 63B. Furthermore, the plurality of fins 72 may be provided at the same surface of the phosphor wheel 6, the surface at which the phosphor layer 61 is provided.

The plurality of fins 72 are curved in the direction opposite the direction of rotation of the phosphor wheel 6 as the distance from the center of the support substrate 63 to the periphery thereof increases, but not necessarily. The fins 72 may each have any other shape, for example, a linearly extending shape.

In each of the embodiments described above, the heat dissipating members 9A to 9D each include the heat sink 91, which is coupled to a side of the heat receiving member 92, the side opposite to the phosphor wheel 6, in a heat transferable manner and disposed outside the light source enclosure CA, but not necessarily. The heat sink 91 and the heat receiving member 92 may be integrated with each other into a single member.

In each of the embodiments described above, the plurality of columnar protrusions 93A, 93C, and 93D each generate turbulence that collides with surfaces of the columnar protrusions, the surfaces opposite to the surfaces with which the airflow collides, but not necessarily. The columnar protrusions that produce the turbulence may be at least one of the plurality of columnar protrusions of the heat dissipating member. That is, all the plurality of columnar protrusions of the heat dissipating member do not necessarily need to generate the turbulence. The turbulence described above does not even need to be generated.

In the first embodiment described above, the plurality of columnar protrusions 93A are disposed on the plurality of reference circles CR1 to CR3, which are concentric circles around the placement section 921. That is, the plurality of columnar protrusions 93A include the plurality of columnar protrusions 93A disposed on the reference circle CR1 facing the placement section 921 when viewed from the phosphor wheel 6 and the plurality of columnar protrusions 93A disposed on the reference circles CR2 and CR3 located outside the reference circle CR1 when viewed from the phosphor wheel 6.

In the second to fourth embodiments described above, the plurality of columnar protrusions 93A, 93C, and 93D are disposed on the plurality of reference circles CR1 to CR6, which are concentric circles around the placement section 921. That is, the plurality of columnar protrusions 93A, 93C, and 93D include the plurality of first columnar protrusions 93A1, 93C1, and 93D1 disposed on the side facing the placement section 921 when viewed from the phosphor wheel 6 and the plurality of second columnar protrusions 93A2, 93C2, and 93D2 disposed outside the plurality of first columnar protrusions 93A1, 93C1, and 93D1 when viewed from the phosphor wheel 6, but not necessarily.

The columnar protrusions of the heat dissipating members 9A to 9D only need to be provided around the placement section 921 of the heat receiving member 92, and the arrangement of the columnar protrusions can be changed as appropriate. For example, the plurality of columnar protrusions may be randomly disposed around the placement section 921.

In the second embodiment above, the plurality of first columnar protrusions 93A1 are provided around the placement section 921 at the first angular intervals based on the first angle, and the plurality of second columnar protrusions 93A2 are provided around the placement section 921 at the second angular intervals based on the second angle, with the second angle being smaller than the first angle, but not necessarily. The second angle may be equal to or greater than the first angle. The same hold true for the third and fourth embodiments, in which the plurality of columnar protrusions 930 and 930 include the plurality of first columnar protrusions 93C1 and 93D1 provided around the placement section 921 at the first angular intervals and the plurality of second columnar protrusions 9302 and 93D2 provided around on the placement section 921 at the second angular intervals.

In the third embodiment described above, the area of a cross section each the second columnar protrusions 93C2, the cross section perpendicular to the direction in which the second columnar protrusions 93C2 from the surface 92A of the heat receiving member 92 into the accommodation space CA1 toward the plurality of fins 72, is greater than the area of a cross section of each of the first columnar protrusions 93C1, the cross section perpendicular to the direction in which the first columnar protrusions 93C1 protrude from the surface 92A of the heat receiving member 92 into the accommodation space CA1 toward the plurality of fins 72, but not necessarily. The area of the aforementioned cross section of each of the second columnar protrusions 93C2 may be smaller than the area of the aforementioned cross section of each of the first columnar protrusions 93C1.

When the area of the aforementioned cross section of one of the first columnar protrusions 93C1 and the second columnar protrusions 93C2 is greater than the area of the aforementioned cross section of the other columnar protrusions, one of the first and second angles may be greater than or equal to the other.

In the fourth embodiment described above, the distance between each of the second columnar protrusions 93D2 and the heat dissipater 7 is smaller than the distance between each of the first columnar protrusions 93D1 and the heat dissipater 7, but not necessarily. The distance between each of the second columnar protrusions 93D2 and the heat dissipater 7 may be greater than or equal to the distance between each of the first columnar protrusions 93D1 and the heat dissipater 7. Furthermore, when the distance between at least one of the plurality of columnar protrusions and the heat dissipater 7 is smaller than the distance between each of the other columnar projections and the heat dissipater 7, the at least one columnar protrusion may be located in any position. The same holds true for the other embodiments.

In the second to fourth embodiments described above, the second columnar protrusions 93A2, 93C2, and 93D2 are disposed in correspondence with the region where the phosphor layer 61 is provided in the phosphor wheel 6, but not necessarily. The second columnar protrusions 93A2, 93C2, and 93D2 may not be disposed in correspondence with the region where the phosphor layer 61 is provided in the phosphor wheel 6. For example, the second columnar protrusions may be provided in a region wider than the region where the phosphor layer 61 is provided, or in a region narrower than the region where the phosphor layer 61 is provided. Furthermore, the second columnar protrusions may be disposed independently of the region where the phosphor layer 61 is provided.

In each of the embodiments described above, the phase of the cycle of the arrangement of the columnar protrusions disposed on the reference circle CR1 differs from the phase of the cycle of the arrangement of the columnar protrusions disposed on the reference circle CR2, but not necessarily. The reference circle having a phase of the cycle or the arrangement of the columnar protrusions different from the phase of the cycle of the arrangement of the other columnar protrusions may be another reference circle. The cycles of the arrangements of the columnar protrusions on all reference circles may have the same phase or phases different from one another.

In each of the embodiments described above, the columnar protrusions 93A, 93C, and 93D are each formed in a substantially truncated conical shape, but not necessarily. The columnar protrusions 93A, 93C, and 93D may be formed in a substantially truncated rectangular pyramidal shape, a substantially cylindrical shape, or a substantially rectangular columnar shape.

In the first embodiment described above, the three reference circles CR1 to CR3 around the placement section 921 are set at the surface 92A of the heat receiving member 92. In the second to fourth embodiments described above, the six reference circles CR1 to CR6 around the placement section 921 are set at the surface 92A of the heat receiving member 92, but not necessarily. The number of reference circles on which the columnar protrusions are arranged can be set as appropriate.

In each of the embodiments described above, the heat receiving member 92 includes the wiring placement section 922, where the wiring FPC coupled to the driver 8, which is placed in the placement section 921, is placed. The plurality of columnar protrusions 93A, 93C, and 93D are provided in a portion excluding the wiring placement section 922, but not necessarily. The wiring placement section 922 may be omitted. Part of the driver 8 may be disposed outside the light source enclosure CA, and the wiring FPC coupled to the driver 8 may be coupled to the driver 8 at a position outside the light source enclosure CA. Furthermore, the wiring FPC may not be a flexible printed circuit board.

In each of the embodiments described above, the light source apparatus 4 has the configuration and layout shown in FIG. 2, but not necessarily. The configuration and layout of any of the light source apparatuses according to the present disclosure are, however, not limited to the those described above. The same holds true for the projector including any of the light source apparatuses according to the present disclosure.

In each of the embodiments described above, the projector includes the three modulators 343B, 343G, and 343R, but not necessarily. The present disclosure is also applicable to a projector including two or less or four or more light modulators.

In each of the embodiments described above, the light modulators 343 are each a transmissive liquid crystal panel having a light incident surface and a light exiting surface different from each other, but not necessarily. The light modulators provided in the projector according to the present disclosure may each include a reflective liquid crystal panel having a surface that serves both as the light incident surface and the light exiting surface. Still instead, the projector may include a light modulator using any component other than a liquid-crystal-based component and capable of modulating an incident luminous flux to form an image according to image information, such as a device using micromirrors, for example, a digital micromirror device (DMD).

The aforementioned embodiments have been described with reference to the case where the light source apparatuses according to the present disclosure are each incorporated in a projector, but not necessarily. The light source apparatuses according to the present disclosure may each be used in an electronic instrument other than a projector, for example, an illuminator and a headlight of an automobile.

Overview of Present Disclosure

The present disclosure will be summarized below as additional remarks.

A light source apparatus according to a first aspect of the present disclosure includes an enclosure, a phosphor wheel including a phosphor that converts the wavelength of light incident thereon and disposed in the enclosure, a wheel-side heat dissipater that includes a plurality of fins provided at one surface of the phosphor wheel and generating an airflow flowing from the side facing the center of the phosphor wheel toward the periphery thereof when the phosphor wheel rotates, a driver that rotates the phosphor wheel, a heat receiving member that includes a placement section where the driver is placed and faces the wheel-side heat dissipater, a heat sink coupled in a heat transferable manner to a side of the heat receiving member opposite to the phosphor wheel, and disposed outside the enclosure, and a plurality of columnar protrusions that are provided around the placement section to transfer heat to the heat receiving member and protrude into the enclosure toward the plurality of fins. A dimension of at least one of the plurality of columnar protrusions along the protrusion direction in which the at least one columnar protrusion protrudes, is greater than a dimension of the at least one columnar protrusion perpendicular to the projection direction. Out of the plurality of columnar protrusions, a columnar protrusion disposed upstream of the airflow flowing to the plurality of columnar protrusions divides the airflow toward other columnar protrusions located downstream of the airflow.

According to the configuration described above, when the phosphor wheel is rotated by the driver, an airflow flowing from the center of the phosphor wheel toward the periphery thereof is generated by the plurality of fins of the wheel-side heat dissipater. Since the heat of the phosphor wheel, that is, the heat generated in the phosphor is transferred from the plurality of fins to the airflow, the phosphor can be cooled.

The airflow generated by the rotation of the phosphor wheel flows to the heat receiving member disposed in a position where the heat receiving member faces the wheel-side heat dissipater. The plurality of columnar protrusions, which protrude into the enclosure toward the plurality of fins, are provided around the placement section in the heat receiving member. Since the plurality of columnar protrusions are coupled to the heat receiving member in a heat transferable manner, the heat received by the plurality of columnar protrusions is transferred to the heat sink via the heat receiving member and dissipated out of the enclosure. The temperature in the enclosure can thus be lowered, and hence the temperature of the airflow flowing to the plurality of fins can be lowered, whereby the phosphor of the phosphor wheel can be cooled at increased cooling efficiency.

Furthermore, the heat receiving member is positioned in a position where the heat receiving member faces the wheel-side heat dissipater. The plurality of columnar protrusions, which are coupled to the heat sink in a heat transferable manner via the heat receiving member, protrude toward the plurality of fins of the wheel-side heat dissipater. The heat sink is coupled in a heat transferable manner to a side of the heat receiving member, the side opposite to the phosphor wheel. The number of components that protrude out of the enclosure, except the heat sink, can therefore be reduced. An increase in size of the light source apparatus can thus be suppressed as compared with the configuration in which a heat sink is provided at each of the plurality of side surfaces of the enclosure.

Therefore, the light source apparatus can be cooled at increased cooling efficiency, and an increase in the size of the light source apparatus can be suppressed.

In the first aspect described above, at least one of the plurality of columnar protrusions may generate turbulence that collides with a surface of the at least one columnar protrusion, the surface opposite to the surface with which the airflow collides.

The configuration described above allows an increase in the contact area where the heated airflow having flowed through the wheel-side heat dissipater comes into contact with the columnar protrusions. The heat transfer from the airflow to the columnar protrusions can therefore be facilitated, whereby the phosphor can be cooled at increased cooling efficiency.

In the first aspect described above, the plurality of columnar protrusions may include a plurality of first columnar protrusions disposed on the side facing the placement section when viewed from the phosphor wheel and a plurality of second columnar protrusions disposed outside the plurality of first columnar protrusions when viewed from the phosphor wheel.

When the airflow generated by the plurality of fins when the phosphor wheel rotates flows along the heat receiving member, the airflow flows from the region outside the heat receiving member toward the placement section.

Therefore, when the plurality of columnar protrusions provided around the placement section so as to be capable of transferring heat to the heat receiving member include a plurality of first columnar protrusions disposed on the side facing the placement section and second columnar protrusions disposed outside the plurality of first columnar protrusions, the airflow is allowed to readily flow along each of the second and first columnar protrusions when the airflow flows toward the placement section. The heat is thus readily transferred from the airflow to the columnar protrusions. The airflow and in turn the phosphor can therefore be cooled at increased cooling efficiency.

In the first aspect described above, the plurality of first columnar protrusions and the plurality of second columnar protrusions may be arranged concentrically around the placement section, the plurality of first columnar protrusions may be provided around the placement section at first angular intervals based on a first angle, the plurality of second columnar protrusions may be provided around the placement section at second angular intervals based on a second angle, and the first angle and the second angle may differ from each other.

According to the configuration described above, when the second angle is set at a value smaller than the first angle, the number of second columnar protrusions disposed on the outer side can be greater than the number of first columnar protrusions located on the side facing the placement section. Since the number of first columnar protrusions is smaller than the number of second columnar protrusions, the gap between the plurality of first columnar protrusions can be increased. The airflow can thus be caused to flow to the plurality of second columnar protrusions to facilitate the heat transfer from the airflow to the second columnar protrusions, and also cause the airflow to readily flow through the gaps between the plurality of first columnar protrusions.

On the other hand, when the second angle is set at a value greater than the first angle, the gap between the plurality of second columnar protrusions can be increased, and the number of first columnar protrusions disposed on the side facing the placement section can be increased. The airflow is thus allowed to readily flow to the plurality of first columnar protrusions.

The temperature of the airflow flowing to the wheel-side heat dissipater, to which the heat of the phosphor is transferred, can therefore be lowered, whereby the phosphor can be cooled at increased cooling efficiency.

In the first aspect described above, the second angle may be smaller than the first angle.

According to the configuration described above, the number of second columnar protrusions disposed on the outer side can be increased, and the gap between the plurality of first columnar protrusions disposed on the side facing the placement section can be increased, as described above. The airflow can thus be caused to flow to the plurality of second columnar protrusions to facilitate the heat transfer from the airflow to the second columnar protrusions, and also cause the airflow to readily flow through the gaps between the plurality of first columnar protrusions. The phosphor can therefore be cooled at increased cooling efficiency.

In the first aspect described above, the area of a cross section of each of the second columnar protrusions, the cross section perpendicular to the protrusion direction, may be greater than the area of a cross section of each of she first columnar protrusions, the cross section perpendicular to the protrusion direction.

When the cross section of each of the first columnar protrusions has a large area, the distance between the plurality of first columnar protrusions decreases, so that the airflow in the portion on the side facing the placement section in the heat receiving member is likely to be blocked.

In contrast, when the area of the cross section of each of the second columnar protrusions is greater than the area of the cross section of each of the first columnar protrusions, the heat can be readily transferred from the airflow to the columnar protrusions in an outer portion of the heat receiving member, the portion where the airflow readily flows. The temperature of the airflow flowing to the wheel-side heat dissipater can therefore be lowered, whereby the phosphor can be cooled at increased cooling efficiency.

In the first aspect described above, the distance between each of the plurality of second columnar protrusions and the wheel-side heat dissipater may be smaller than the distance between each of the plurality of first columnar protrusions and the wheel-side heat dissipater.

According to the configuration described above, the heat can be readily transferred to the columnar protrusions from the wheel-side heat dissipater in positions away from the placement section, where the driver is disposed. The heat transfer to the driver can therefore be suppressed, whereby the influence of the heat on the driver can be suppressed.

In the first aspect described above, the plurality of second columnar protrusions may be disposed in correspondence with the region where the phosphor is provided in the phosphor wheel.

When the phosphor wheel rotates, the airflow primarily flows in the direction from the center of the phosphor wheel toward the periphery thereof, and the airflow flows also in the direction from the plurality of fins toward the heat receiving member.

The aforementioned arrangement of the plurality of second columnar protrusions therefore allows the heat generated in the phosphor to be readily transferred via the airflow to the plurality of second columnar protrusions. The heat generated in the phosphor can therefore be readily transferred to the columnar protrusions in positions away from the placement section, where the driver is disposed.

In the first aspect described above, the heat receiving member may include a wiring placement section where wiring coupled to the driver is placed, and the plurality of columnar protrusions may be provided in the heat receiving member except the wiring placement section.

The configuration described above prevents the wiring coupled to the driver from being in contact with the columnar protrusions, to which the heat is transferred from the phosphor via the airflow. The influence of the heat on the wiring and the driver can be therefore suppressed.

A light source apparatus according to a second aspect of the present disclosure includes an enclosure, a phosphor wheel including a phosphor that converts the wavelength of light incident thereon and disposed in the enclosure, a wheel-side heat dissipater that includes a plurality of fins provided at one surface of the phosphor wheel and generating an airflow flowing from the side facing the center of the phosphor wheel toward the periphery thereof when the phosphor wheel rotates, a driver that rotates the phosphor wheel, and a heat dissipating member that faces the wheel-side heat dissipater. The heat dissipating member includes a placement section where the driver is placed, a heat sink provided on a side of the placement section opposite the phosphor wheel, and disposed outside the enclosure, and a plurality of columnar protrusions provided around the placement section and protruding into the enclosure toward the plurality of fins. A dimension of at least one of the plurality of columnar protrusions along the protrusion direction in which the at least one columnar protrusion protrudes, is greater than a dimension of the at least one columnar protrusion perpendicular to the projection direction. Out of the plurality of columnar protrusions, a columnar protrusion disposed upstream of the airflow flowing to the plurality of columnar protrusions divides the airflow toward columnar protrusions located downstream of the airflow.

The configuration described above can provide the same effects as those provided by the light source apparatus according to the first aspect described above.

A projector according to a third aspect of the present disclosure includes the light source apparatus according to the first or second aspect described above, an image formation apparatus that forms image light by using the light outputted from the light source apparatus, and a projection optical apparatus that projects the image light formed by the image for apparatus.

The configuration described above can provide the same effects as those provided by the light source apparatus according to the first or second aspect described above. Furthermore, since the phosphor can be cooled at increased cooling efficiency, the luminance of the light outputted from the light source apparatus can be increased by increasing the intensity of the light incident on the phosphor. The luminance of the projected image light can therefore be increased.

What is claimed is:

1. A light source apparatus comprising:
an enclosure;
a phosphor wheel including a phosphor that converts a wavelength of light incident thereon and disposed in the enclosure;
a wheel-side heat dissipater that includes a plurality of fins provided at one surface of the phosphor wheel and generating an airflow flowing from a side facing a center of the phosphor wheel toward a periphery thereof when the phosphor wheel rotates;
a driver that rotates the phosphor wheel;
a heat receiving member that includes a placement section where the driver is placed and faces the wheel-side heat dissipater;
a heat sink coupled in a heat transferable manner to a side of the heat receiving member opposite to the phosphor wheel, and disposed outside the enclosure; and
a plurality of columnar protrusions that are provided around the placement section to transfer heat to the heat receiving member and protrude into the enclosure toward the plurality of fins,
wherein a dimension of at least one of the plurality of columnar protrusions along a protrusion direction in which the at least one columnar protrusion protrudes, is greater than a dimension of the at least one columnar protrusion perpendicular to the projection direction, and
out of the plurality of columnar protrusions, a columnar protrusion disposed upstream of the airflow flowing to the plurality of columnar protrusions divides the airflow toward other columnar protrusions located downstream of the airflow.

2. The light source apparatus according to claim 1, wherein at least one of the plurality of columnar protrusions generates turbulence that collides with a surface of the at least one columnar protrusion, the surface opposite to a surface with which the airflow collides.

3. The light source apparatus according to claim 1, wherein the plurality of columnar protrusions include a plurality of first columnar protrusions disposed on a side facing the placement section when viewed from the phosphor wheel, and
a plurality of second columnar protrusions disposed outside the plurality of first columnar protrusions when viewed from the phosphor wheel.

4. The light source apparatus according to claim 3, wherein the plurality of first columnar protrusions and the plurality of second columnar protrusions are arranged concentrically around the placement section,
the plurality of first columnar protrusions are provided around the placement section at first angular intervals based on a first angle,
the plurality of second columnar protrusions are provided around the placement section at second angular intervals based on a second angle, and
the first angle and the second angle differ from each other.

5. The light source apparatus according to claim 4, wherein the second angle is smaller than the first angle.

6. The light source apparatus according to claim 3, wherein an area of a cross section of each of the second columnar protrusions perpendicular to the protrusion direction is greater than an area of a cross section of each of the first columnar protrusions perpendicular to the protrusion direction.

7. The light source apparatus according to claim 3, wherein a distance between each of the plurality of second columnar protrusions and the wheel-side heat dissipater is smaller than a distance between each of the plurality of first columnar protrusions and the wheel-side heat dissipater.

8. The light source apparatus according to claim 3, wherein the plurality of second columnar protrusions are disposed in correspondence with a region where the phosphor is provided in the phosphor wheel.

9. The light source apparatus according to claim 1, wherein the heat receiving member includes a wiring placement section where wiring coupled to the driver is placed, and the plurality of columnar protrusions are provided in the heat receiving member except the wiring placement section.

10. A light source apparatus comprising:
an enclosure;
a phosphor wheel including a phosphor that converts a wavelength of light incident thereon and disposed in the enclosure;
a wheel-side heat dissipater that includes a plurality of fins provided at one surface of the phosphor wheel and generating an airflow flowing from a side facing a center of the phosphor wheel toward a periphery thereof when the phosphor wheel rotates;
a driver that rotates the phosphor wheel; and
a heat dissipating member that faces the wheel-side heat dissipater,
wherein the heat dissipating member includes
a placement section where the driver is placed,
a heat sink provided on a side of the placement section opposite to the phosphor wheel, and disposed outside the enclosure, and
a plurality of columnar protrusions provided around the placement section and protruding into the enclosure toward the plurality of fins,
a dimension of at least one of the plurality of columnar protrusions along a protrusion direction in which the at least one columnar protrusion protrudes, is greater than a dimension of the at least one columnar protrusion perpendicular to the projection direction, and
out of the plurality of columnar protrusions, a columnar protrusion disposed upstream of the airflow flowing to the plurality of columnar protrusions divides the airflow toward columnar protrusions located downstream of the airflow.

11. A projector comprising:
the light source apparatus according to claim 1;
an image formation apparatus that forms image light by using light outputted from the light source apparatus; and
a projection optical apparatus that projects the image light formed by the image formation apparatus.

* * * * *